United States Patent
Zhang

(10) Patent No.: US 10,966,230 B2
(45) Date of Patent: Mar. 30, 2021

(54) METHOD AND DEVICE IN UE AND BASE STATION USED FOR WIRELESS COMMUNICATION

(71) Applicant: XiaoBo Zhang, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 23 days.

(21) Appl. No.: 16/554,611

(22) Filed: Aug. 28, 2019

(65) Prior Publication Data

US 2019/0387537 A1   Dec. 19, 2019

Related U.S. Application Data

(63) Continuation of application No. PCT/CN2017/105190, filed on Oct. 1, 2017.

(30) Foreign Application Priority Data

Mar. 17, 2017   (CN) .......................... 201710161931.3

(51) Int. Cl.
*H04W 72/12*   (2009.01)
*H04L 1/00*   (2006.01)
(Continued)

(52) U.S. Cl.
CPC ....... *H04W 72/1273* (2013.01); *H04L 1/0003* (2013.01); *H04L 1/189* (2013.01); *H04W 72/0413* (2013.01); *H04W 72/0453* (2013.01)

(58) Field of Classification Search
CPC ... H04B 7/0456; H04B 7/0617; H04L 5/0053; H04L 1/0041; H04L 1/0026; H04L 1/0009; H04W 72/1284
See application file for complete search history.

(56) References Cited

U.S. PATENT DOCUMENTS

2015/0249984 A1*   9/2015   Papasakellariou .... H04L 1/0072
370/329

FOREIGN PATENT DOCUMENTS

CN   102263617 A   11/2011
CN   104935403 A   9/2015

OTHER PUBLICATIONS

ISR received in application No. PCT/CN2017/105190 dated Dec. 29, 2017.
(Continued)

*Primary Examiner* — Afshawn M Towfighi

(57) ABSTRACT

The present disclosure provides a method and a device in a User Equipment (UE) and a base station for wireless communication. A UE first receives a first signaling, and transmits a first radio signal. Herein, the first signaling comprises scheduling information of the first radio signal, the first radio signal comprises M first type sub-signal (s) and a second type sub-signal, the M first type sub-signal(s) carries(carry) M first type bit block(s), the second type sub-signal carries a second type bit block. M first type value(s) is(are) respectively used to determine the number(s) of Resource Elements (REs) occupied by the M first type sub-signal(s) in time-frequency domain. The M first type value(s) corresponds(correspond) to M reference value(s) respectively, the first signaling is used to determine a ratio of each first type value of the M first type value(s) to a corresponding reference value.

20 Claims, 10 Drawing Sheets

(51) Int. Cl.
*H04L 1/18* (2006.01)
*H04W 72/04* (2009.01)

(56) References Cited

OTHER PUBLICATIONS

Further Discussion on Data and Control Multiplexing in UL MIMO Transmissions,Samsung, 3GPP TSG RAN WG1 #61bis ,R1-103675, Dresden, Germany, Jul. 2, 2010.

* cited by examiner

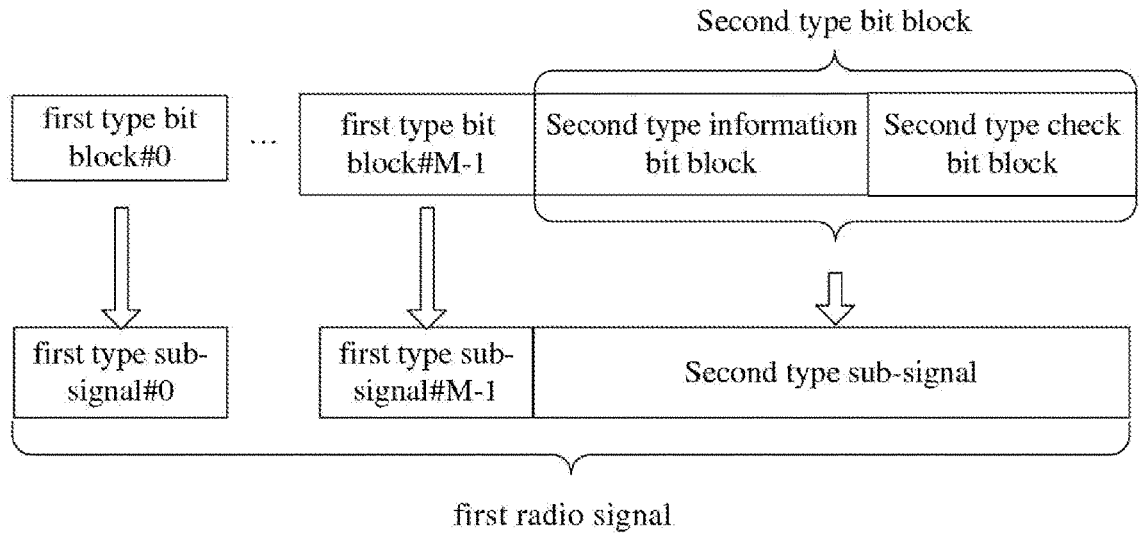

$$\text{reference value\#i} = \frac{\text{the number of REs occupied by first radio signal in time-frequency domain}}{\text{the number of bits in second type bit block}}, \quad i = 0, \cdots, M-1$$

first type value#i = reference value#i × first offset#i,  $\quad i = 0, \cdots, M-1$

*Or* first type value#i = reference value#i × first offset#i × second offset,  $\quad i = 0, \cdots, M-1$

*Or* first type value#i = reference value#i × (first offset#i + second offset),  $\quad i = 0, \cdots, M-1$ the number of REs occupied by first type sub-signal#i = min(first type value#i × the number of bits in first type bit block#i, first limit value#i),  $\quad i = 0, \cdots, M-1$

FIG.3

METHOD AND DEVICE IN UE AND BASE STATION USED FOR WIRELESS COMMUNICATION

CROSS-REFERENCE TO RELATED APPLICATION

This application is a continuation of International Application No. PCT/CN2017/105190, filed Oct. 1, 2017, claiming the priority benefit of Chinese Patent Application Serial Number 201710161931.3, filed on Mar. 17, 2017, the full disclosure of which is incorporated herein by reference.

BACKGROUND

Technical Field

The present disclosure relates to transmission methods and devices for radio signals in wireless communication systems, and in particular to a transmission scheme and device for radio signals in a wireless communication system that supports uplink control information transmission.

Related Art

In traditional Long Term Evolution (LTE) systems, when a User Equipment (UE) is required to transmit uplink control information (UCI) and uplink data simultaneously on a sub-frame, UCI can be transmitted together with data on an uplink physical layer data channel. A number of Resource Elements (REs) occupied by UCI on the uplink physical layer data channel is related to a Modulation and Coding Scheme (MCS) employed in a first transmission of uplink data. Since the MCS of uplink data reflects the channel quality of an uplink channel, the method ensures transmission reliability of UCI on an uplink physical layer data channel.

SUMMARY

Compared with traditional LTE systems, 5G systems will support more diversified application scenarios, such as enhanced Mobile BroadBand (eMBB), Ultra-Reliable and Low Latency Communications (URLLC) and massive Machine-Type Communications (mMTC). Different application scenarios may have varying requirements for transmission reliability on a physical layer, and the gap between these requirements may be more than one order of magnitude on some occasions. Inventors have found through researches that if technologies in existing LTE systems continue to be applied, transmission reliability of UCI will vary from one application scenario to another when multiplexed with uplink data, which will probably cause wastes of uplink radio resources in some cases.

Inventors also have found through researches that in a system using multi-antenna beamforming, when different beamforming vectors are employed in a first transmission and a retransmission, there will be large distinction between uplink channel qualities respectively corresponding to the first transmission and retransmission. According to technologies in existing LTE systems, the number of REs occupied by UCI is always related to MCS of the first transmission. When UCI is multiplexed with retransmitted uplink data, and a beamforming vector employed in retransmission is different from that in first transmission, it will be hard to guarantee UCI transmission quality.

In view of the above problem, the present disclosure provides a solution. It should be noted that if no conflict is incurred, the embodiments in a UE of the present disclosure and the characteristics in the embodiments may be applied to a base station, and vice versa. The embodiments of the present disclosure and the characteristics in the embodiments may be mutually combined, if no conflict is incurred.

The present disclosure provides a method in a User Equipment (UE) used for wireless communication, comprising the following steps:

Step A: receiving a first signaling; and
Step B: transmitting a first radio signal;

Herein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

In one embodiment, the above method is advantageous in that a maintenance base station for a serving cell of the UE can dynamically adjust a number of REs occupied by the M first type sub-signal(s) in time-frequency domain via the first signaling so as to control transmission reliability of the M first type bit block(s) in a flexible manner.

In one embodiment, the above method is advantageous in that whatever the transmission reliability of a physical layer for the second type bit block is, a maintenance base station for a serving cell of the UE can change ratio(s) of the M first type value(s) to corresponding reference value(s) to ensure the stability of transmission reliability of the M first type bit block(s).

In one embodiment, the above method is advantageous in that when the M reference value(s) do not match with a channel which the first radio signal goes through, a maintenance base station for a serving cell of the UE can change ratio(s) of the M first type value(s) to corresponding reference value(s) to ensure that the M first type bit block(s) has(have) sufficiently high transmission reliability.

In one embodiment, the Resource Elements (REs) occupy duration time of a broadband symbol in time domain, and occupy a subcarrier bandwidth in frequency domain.

In one subembodiment of the above embodiment, the broadband symbol is an Orthogonal Frequency Division Multiplexing (OFDM) symbol.

In one subembodiment of the above embodiment, the broadband symbol is a Discrete Fourier Transform Spread OFDM (DFT-S-OFDM) symbol.

In one subembodiment of the above embodiment, the broadband symbol is a Filter Bank Multi Carrier (FBMC) symbol.

In one embodiment, the M reference value(s) is(are) determined by a number of REs occupied by the first radio signal in time-frequency domain and a number of bits comprised in the second type bit block.

In one embodiment, the M reference value(s) is(are) determined by a number of REs occupied by a second radio signal in time-frequency domain and a number of bits comprised in the second type bit block, the second radio signal carries the second type bit block. The second radio signal is an initial transmission of the second type bit block, the first radio signal is a retransmission of the second type bit block.

In one embodiment, REs occupied by any first type sub-signal of the M first type sub-signal(s) in time-frequency domain and those occupied by the second type sub-signal in time-frequency domain are non-overlapping.

In one embodiment, REs occupied by any two different first type sub-signals of the M first type sub-signals in time-frequency domain are non-overlapping.

In one embodiment, the first signaling is a physical layer signaling.

In one embodiment, the first signaling is a dynamic signaling.

In one embodiment, the first signaling is a dynamic signaling used for uplink grant.

In one embodiment, the first signaling is transmitted on a downlink physical layer control channel (i.e., a downlink channel that can only be used for bearing a physical layer signaling).

In one subembodiment of the above embodiment, the downlink physical layer control channel is a Physical Downlink Control CHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one embodiment, the scheduling information includes at least one of a time domain resource occupied, a frequency domain resource occupied, a Modulation and Coding Scheme (MCS), a Hybrid Automatic Repeat reQuest (HARQ) process number, a Redundancy Version (RV) or a New Data Indicator (NDI).

In one embodiment, the first radio signal comprises uplink data and uplink control information (UCI).

In one embodiment, the first radio signal is transmitted on an uplink physical layer data channel (i.e., an uplink channel that can be used for bearing physical layer data).

In one subembodiment of the above embodiment, the uplink physical layer data channel is a Physical Uplink Shared CHannel (PUSCH).

In one subembodiment of the above embodiment, the uplink physical layer data channel is a short PUSCH (sPUSCH).

In one embodiment, the M first type bit block(s) comprises(comprise) Uplink Control Information (UCI) respectively.

In one subembodiment of the above embodiment, the UCI includes at least one of HARQ-Acknowledgement (ACK), Channel State Information (CSI), a Rank Indicator (RI), a Channel Quality Indicator (CQI), a Precoding Matrix Indicator (PMI), or a Channel-state information reference signals Resource Indicator (CRI).

In one embodiment, the second type bit block comprises uplink data.

In one embodiment, the M first type sub-signal(s) corresponds(correspond) to M first limit value(s) respectively. For any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

In one subembodiment of the above embodiment, a first limit value corresponding to the given first type sub-signal is equal to a number of subcarriers occupied by the first radio signal in frequency domain multiplied by 4, the given first type sub-signal carries at least one of HARQ-ACK, an RI, or a CRI.

In one subembodiment of the above embodiment, a first limit value corresponding to the given first type sub-signal is equal to the number of REs occupied by the first radio signal in time-frequency domain minus a ratio of $Q_{RI}^{(x)}$ to $Q_m^{(x)}$, the given first type sub-signal carries at least one of a CQI or a PMI. The $Q_{RI}^{(x)}$ is related to a number of bits in RI(s) or CRI(s) carried by the M first type sub-signal(s), the $Q_m^{(x)}$ is related to modulation order of the second type sub-signal. The specific meaning of the $Q_{RI}^{(x)}$ and the $Q_m^{(x)}$ can be found in TS36.212.

In one embodiment, the M first type sub-signal(s) corresponds(correspond) to M first limit value(s) respectively. For any given first type sub-signal of the M first type sub-signal(s), the number of REs occupied by the given first type sub-signal in time-frequency domain is equal to a maximum value between a second limit value and a minimum value between a corresponding first limit value and a product of a corresponding first type value and a number of bits comprised in a corresponding first type bit block.

In one subembodiment of the above embodiment, a first limit value corresponding to the given first type sub-signal is equal to a number of subcarriers occupied by the first radio signal in frequency domain multiplied by 4.

In one subembodiment of the above embodiment, the second limit value is equal to $Q'_{min}$, the $Q'_{min}$ is determined by modulation order of the second type sub-signal and a number of bits in a first type bit block corresponding to the given first type sub-signal. The specific meaning of the $Q'_{min}$ in can be found in TS36.212.

In one subembodiment of the above embodiment, the given first type sub-signal carries at least one of HARQ-ACK, an RI, or a CRI.

In one embodiment, a given radio signal carrying a given bit block refers to: the given radio signal is an output after the given bit block is sequentially subjected to Channel Coding, a Modulation Mapper, a Layer Mapper, Precoding, a Resource Element Mapper, and Broadband Symbol Generation.

In one embodiment, a given radio signal carrying a given bit block refers to: the given radio signal is an output after the given bit block is sequentially subjected to Channel Coding, a Modulation Mapper, a Layer Mapper, a transform precoder, Precoding, a Resource Element Mapper, and Broadband Symbol Generation.

In one embodiment, a given radio signal carrying a given bit block refers to: the given bit block is used to generate the given radio signal.

Specifically, according to one aspect of the present disclosure, wherein the number of REs occupied by the first radio signal in time-frequency domain is used to determine the M reference value(s).

In one embodiment, the M reference value(s) is(are) equal to a ratio of the number of REs occupied by the first radio signal in time-frequency domain to a number of bits comprised in the second type bit block respectively.

In one subembodiment of the above embodiment, the first radio signal is a first transmission of the second type bit block.

In one subembodiment of the above embodiment, the second type bit block comprises a second type information bit block and a second type check bit block, the second type check bit block is a Cyclic Redundancy Check (CRC) bit block of the second type information bit block.

In a reference embodiment of the above subembodiment, a CRC bit block of a given bit block refers to an output after the given bit block is subjected to CRC cyclic generator polynomial. A polynomial consisting of the given bit block and a CRC bit block of the given bit block can be divided by the CRC cyclic generator polynomial on GF(2), namely, the polynomial consisting of the given bit block and a CRC bit block of the given bit block yields a remainder equal to 0 when divided by the CRC Cyclic Generator Polynomial.

In one embodiment, the second type sub-signal comprises a first sub-signal and a second sub-signal, the second type bit block comprises a first bit block and a second bit block, the first sub-signal carries the first bit block, the second sub-signal carries the second bit block. M1 reference value(s) of the M reference value(s) is(are) respectively equal to a reciprocal of a sum of a number of bits in the first bit block divided by a number of REs occupied by the first sub-signal in time-frequency domain and a number of bits in the second bit block divided by a number of REs occupied by the second sub-signal in time-frequency domain. Reference value(s) of the M reference value(s) not belonging to the M1 reference value(s) is(are) respectively equal to a ratio of a number of REs occupied by a first target sub-signal in time-frequency domain to a number of bits in a first target bit block. The first target sub-signal is one of the first sub-signal and the second sub-signal, the first target bit block is one of the first bit block and the second bit block, the first target sub-signal carries the first target bit block. The M1 is a non-negative integer less than or equal to the M.

In one subembodiment of the above embodiment, the first radio signal is an initial transmission of the second type bit block.

In one subembodiment of the above embodiment, the first target sub-signal is one of the first sub-signal and the second sub-signal that corresponds to a maximum IMCS, the IMCS indicates MCS of a corresponding radio signal. The specific meaning of the IMCS can be found in TS36.213 and TS36.212.

In one subembodiment of the above embodiment, the M1 is equal to 0.

In one subembodiment of the above embodiment, the M1 is equal to the M.

In one subembodiment of the above embodiment, the M1 is less than the M.

In one subembodiment of the above embodiment, a first type sub-signal corresponding to any one reference value of the M1 reference value(s) carries at least one of HARQ-ACK, an RI, or a CRI.

In one subembodiment of the above embodiment, a first type sub-signal corresponding to any one reference value of the M reference value(s) not belonging to the M1 reference value(s) carries at least one of a CQI or a PMI.

In one subembodiment of the above embodiment, the first bit block comprises a first information bit block and a first check bit block, the second bit block comprises a second information bit block and a second check bit block. The first check bit block is a CRC bit block of the first information bit block, the second check bit block is a CRC bit block of the second information bit block.

In a reference embodiment of the above subembodiment, the second check bit block is not related to the first information bit block, the first check bit block is not related to the second information bit block.

In one embodiment, M3 first type bit block(s) is(are) a subset of the M first type bit block(s), for any given first type bit block of the M3 first type bit block(s), the given first bit block comprises a given first type information bit block and a given first type check bit block, the given first type check bit block is a CRC bit block of the given first type information bit block. The M3 is a non-negative integer less than or equal to the M.

In one subembodiment of the above embodiment, the M3 is equal to 0.

In one subembodiment of the above embodiment, the M3 is equal to the M.

In one subembodiment of the above embodiment, the M3 is less than the M.

Specifically, according to one aspect of the present disclosure, wherein a number of REs occupied by a second radio signal in time-frequency domain is used to determine the M reference value(s); the second radio signal carries the second type bit block; the second radio signal is an initial transmission of the second type bit block, the first radio signal is a retransmission of the second type bit block.

In one embodiment, a time domain resource occupied by the second radio signal is prior to a time domain resource occupied by the first radio signal.

In one embodiment, the second radio signal comprises at least the former of uplink data and UCI.

In one embodiment, the second radio signal is transmitted on an uplink physical layer data channel (i.e., an uplink channel that can be used for bearing physical layer data).

In one subembodiment of the above embodiment, the uplink physical layer data channel is a PUSCH.

In one subembodiment of the above embodiment, the uplink physical layer data channel is an sPUSCH.

In one embodiment, an RV of the second radio signal is different from that of the first radio signal.

In one embodiment, an NDI for the second radio signal is different from that for the first radio signal.

In one embodiment, the first radio signal and the second radio signal correspond to a same HARQ process number.

In one embodiment, the M reference value(s) is(are) equal to a ratio of the number of REs occupied by the second radio signal in time-frequency domain to a number of bits comprised in the second type bit block respectively.

In one subembodiment of the above embodiment, the second type bit block comprises a second type information bit block and a second type check bit block, the second type check bit block is a CRC bit block of the second type information bit block.

In one embodiment, the second radio signal comprises a third sub-signal and a fourth sub-signal, the second type bit block comprises a first bit block and a second bit block, the third sub-signal carries the first bit block, the fourth sub-signal carries the second bit block. M2 reference value(s) of the M reference value(s) is(are) respectively equal to a reciprocal of a sum of the number of bits in the first bit block divided by a number of REs occupied by the third sub-signal in time-frequency domain and the number of bits in the second bit block divided by a number of REs occupied by the fourth sub-signal in time-frequency domain. Reference value(s) of the M reference value(s) not belonging to the M2 reference value(s) is(are) respectively equal to a ratio of a number of REs occupied by a second target sub-signal in time-frequency domain to a number of bits in a second target bit block. The second target sub-signal is one of the third sub-signal and the fourth sub-signal, the second target bit block is one of the first bit block and the second bit block, the second target sub-signal carries the second target bit block. The M2 is a non-negative integer less than or equal to the M.

In one subembodiment of the above embodiment, the second target sub-signal is one of the third sub-signal and the fourth sub-signal that corresponds to a maximum IMCS, the IMCS indicates MCS of a corresponding radio signal. The specific meaning of the IMCS can be found in TS36.213 and TS36.212.

In one subembodiment of the above embodiment, the M2 is equal to 0.

In one subembodiment of the above embodiment, the M2 is equal to the M.

In one subembodiment of the above embodiment, the M2 is less than the M.

In one subembodiment of the above embodiment, a first type sub-signal corresponding to any one reference value of the M2 reference value(s) carries at least one of HARQ-ACK, an RI, or a CRI.

In one subembodiment of the above embodiment, a first type sub-signal corresponding to any one reference value of the M reference value(s) not belonging to the M2 reference value(s) carries at least one of a CQI or a PMI.

In one subembodiment of the above embodiment, the first bit block comprises a first information bit block and a first check bit block, the second bit block comprises a second information bit block and a second check bit block. The first check bit block is a CRC bit block of the first information bit block, the second check bit block is a CRC bit block of the second information bit block.

In a reference embodiment of the above subembodiment, the second check bit block is not related to the first information bit block, the first check bit block is not related to the second information bit block.

Specifically, according to one aspect of the present disclosure, wherein the Step A and the Step B further comprise the following steps:

Step A0: receiving a second signaling; and
Step B0: transmitting the second radio signal;

Herein, the second signaling comprises scheduling information of the second radio signal.

In one embodiment, a time domain resource occupied by the second signaling is prior to that occupied by the first signaling.

In one embodiment, the second signaling is a physical layer signaling.

In one embodiment, the second signaling is a dynamic signaling.

In one embodiment, the second signaling is a dynamic signaling used for uplink grant.

In one embodiment, the second signaling is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one embodiment, the first signaling and the second signaling both comprise a second field and a third field, a second field of the first signaling indicates at least the former of an MCS and an RV of the second type sub-signal, a second field of the second signaling indicates at least the former of an MCS and an RV of uplink data in the second radio signal, a third field of the first signaling indicates a time-frequency resource occupied by the first radio signal, a third field of the second signaling indicates a time-frequency resource occupied by the second radio signal.

In one subembodiment of the above embodiment, a second field of the first signaling and a third field of the first signaling are used to determine a number of bits in the second type bit block, the first radio signal is an initial transmission of the second type bit block.

In one subembodiment of the above embodiment, a second field of the second signaling and a third field of the second signaling are used to determine the number of bits in the second type bit block, the second radio signal is an initial transmission of the second type bit block, the first radio signal is a retransmission of the second type bit block.

Specifically, according to one aspect of the present disclosure, wherein the first signaling is used to determine M first offset(s), the M first type value(s) corresponds(correspond) to the M first offset(s) respectively, any first type value of the M first type value(s) is linearly correlated to a corresponding first offset.

In one embodiment, the M first offset(s) is(are) positive real number(s) not less than 1, respectively.

In one embodiment, the M first offset(s) is(are) positive real number(s), respectively.

In one embodiment, a linear coefficient between any first type value of the M first type value(s) and a corresponding first offset is a positive real number.

In one embodiment, any first type value of the M first type value(s) is equal to a product of a corresponding first offset and a corresponding reference value.

In one embodiment, at least two first offsets out of the M first offsets are unequal, the M is a positive integer greater than 1.

In one embodiment, the first signaling explicitly indicates the M first offset(s).

In one embodiment, the first signaling comprises a first field, the first field of the first signaling explicitly indicates the M first offset(s).

In one subembodiment of the above embodiment, the first field comprises 1 bit.

In one subembodiment of the above embodiment, the first field comprises 2 bits.

In one subembodiment of the above embodiment, the first field comprises 3 bits.

In one subembodiment of the above embodiment, the first field comprises 4 bits.

In one embodiment, the first signaling implicitly indicates the M first offset(s).

In one embodiment, the first signaling comprises a second field, the second field of the first signaling indicates at least the former of an MCS and an RV of the second type sub-signal, a second field of the first signaling implicitly indicates the M first offset(s).

In one subembodiment of the above embodiment, the M first offset(s) belongs(belong) to M offset set(s) respectively, an index of any first offset of the M first offset(s) in a corresponding offset set is related to at least the former of an MCS and an RV of the second type sub-signal.

In one subembodiment of the above embodiment, an index of any first offset of the M first offset(s) in a corresponding offset set is equal to a reference index, the reference index is related to at least the former of an MCS and an RV of the second type sub-signal.

In one embodiment, the first signaling comprises a third field, a third field of the first signaling indicates a time-frequency resource occupied by the first radio signal, a third field of the first signaling implicitly indicates the M first offset(s).

In one subembodiment of the above embodiment, the M first offset(s) belongs(belong) to M offset set(s), an index of any first offset of the M first offset(s) in a corresponding offset set is related to a time-frequency resource occupied by the first radio signal.

In one subembodiment of the above embodiment, an index of any first offset of the M first offset(s) in a corresponding offset set is equal to a reference index, the reference index is related to a time-frequency resource occupied by the first radio signal.

In one embodiment, the second offset is a positive real number.

In one embodiment, a linear coefficient between any first type value of the M first type value(s) and the second offset is a positive real number.

In one embodiment, any first type value of the M first type value(s) is equal to a product of a corresponding reference value and a corresponding first offset further multiplied by the second offset.

In one embodiment, the above method is advantageous in that through a higher-layer signaling the M first offset(s) is(are) respectively configured to the M first type bit block(s), and combined with a physical layer signaling, the second offset is used to make adjustments to all of the M first offset(s), therefore, transmission reliability of the M first type bit block(s) can be controlled flexibly and excessive physical layer signaling overhead can be avoided.

In one embodiment, any first type value of the M first type value(s) is equal to a corresponding reference value multiplied by a sum of a corresponding first offset and the second offset.

In one embodiment, the first signaling explicitly indicates the second offset.

In one embodiment, the first signaling comprises a first field, the first field of the first signaling explicitly indicates the second offset.

In one subembodiment of the above embodiment, the second offset belongs to an offset group, the offset group comprises a positive integer number of offset(s), the first field of the first signaling explicitly indicates an index of the second offset in the offset group.

In one subembodiment of the above embodiment, the first field comprises 1 bit.

In one subembodiment of the above embodiment, the first field comprises 2 bits.

In one subembodiment of the above embodiment, the first field comprises 3 bits.

In one subembodiment of the above embodiment, the first field comprises 4 bits.

In one embodiment, the first signaling implicitly indicates the second offset.

In one embodiment, the first signaling comprises a second field, the second field of the first signaling indicates at least the former of an MCS and an RV of the second type sub-signal, the second field of the first signaling implicitly indicates the second offset.

In one subembodiment of the above embodiment, the second offset belongs to an offset group, the offset group comprises a positive integer number of offset(s), an index of the second offset in the offset group is related to at least the former of an MCS and an RV of the second type sub-signal.

In one embodiment, the first signaling comprises a third field, the third field of the first signaling indicates a time-frequency resource occupied by the first radio signal, the third field of the first signaling implicitly indicates the second offset.

In one embodiment of the above embodiment, the second offset belongs to an offset group, the offset group comprises a positive integer number of offset(s), an index of the second offset in the offset group is related to a time-frequency resource occupied by the first radio signal.

Specifically, according to one aspect of the present disclosure, wherein the Step A further comprises the following step:

Step A1: receiving a first downlink signaling;

wherein the first downlink signaling is used to determine M offset set(s), any offset set of the M offset set(s) comprises a positive integer number of offset(s), the M first offset(s) belongs(belong) to the M offset set(s) respectively.

In one embodiment, the first downlink signaling is a higher-layer signaling.

In one subembodiment of the above embodiment, the first downlink signaling is a Radio Resource Control (RRC) signaling.

In one embodiment, the above embodiment is advantageous in that a higher-layer signaling and a physical layer signaling are jointly used to determine the M first offset(s), so that transmission reliability of the M first type bit block(s) can be flexibly controlled and excessive physical layer signaling overhead can be avoided.

In one embodiment, the first downlink signaling is semi-statically configured.

In one embodiment, the first downlink signaling is UE-specific.

In one embodiment, the first signaling explicitly indicates an index of each first offset of the M first offset(s) in a corresponding offset set.

In one embodiment, the first signaling comprises a first field, the first field of the first signaling explicitly indicates an index of each first offset of the M first offset(s) in a corresponding offset set.

In one embodiment, the first signaling comprises a second field, the second field of the first signaling indicates at least the former of an MCS and an RV of the second type sub-signal, the second field of the first signaling implicitly indicates an index of each first offset of the M first offset(s) in a corresponding offset set.

In one subembodiment of the above embodiment, an index of any first offset of the M first offset(s) in a corresponding offset set is related to at least the former of MCS and an RV of the second type sub-signal.

In one subembodiment of the above embodiment, an index of any first offset of the M first offset(s) in a corresponding offset set is equal to a reference index, the reference index is related to at least the former of an MCS and an RV of the second type sub-signal.

In one embodiment, the first signaling comprises a third field, the third field of the first signaling indicates a time-frequency resource occupied by the first radio signal, the third field of the first signaling implicitly indicates an index of each first offset of the M first offset(s) in a corresponding offset set.

In one subembodiment of the above embodiment, an index of any first offset of the M first offset(s) in a corresponding offset set is related to a time-frequency resource occupied by the first radio signal.

In one subembodiment of the above embodiment, an index of any first offset of the M first offset(s) in a corresponding offset set is equal to a reference index, the reference index is related to a time-frequency resource occupied by the first radio signal.

In one embodiment, any two offset sets of the M offset sets comprise an equal number of offsets.

In one embodiment, at least two offset sets of the M offset sets comprise different numbers of offsets.

Specifically, according to one aspect of the present disclosure, wherein the Step A further comprises the following step:

Step A2: receiving a second downlink signaling;

Herein, the second downlink signaling is used to determine M first offset(s), the M first type value(s) corresponds (correspond) to the M first offset(s) respectively, any first type value of the M first type value(s) is linearly correlated to a corresponding first offset.

In one embodiment, the second downlink signaling is a higher-layer signaling.

In one subembodiment of the above embodiment, the second downlink signaling is a Radio Resource Control (RRC) signaling.

In one embodiment, the second downlink signaling is semi-statically configured.

In one embodiment, the second downlink signaling is UE-specific.

In one embodiment, X1 first offset(s) out of the M first offset(s) is(are) $\beta_{offset}^{HARQ-ACK}$, X2 first offset(s) out of the M first offset(s) is(are) $\beta_{offset}^{RI}$, X3 first offset(s) out of the M first offset(s) is(are) $\beta_{offset}^{CQI}$, the X1, the X2 and the X3 are respectively non-negative integers not greater than the M, a sum of the X1, the X2 and the X3 is equal to the M. The $\beta_{offset}^{HARQ-ACK}$, the $\beta_{offset}^{RI}$, and the $\beta_{offset}^{CQI}$ are an offset between transmission rate of HARQ-ACK and a corresponding reference value, an offset between transmission rate of an RI/CRI and a corresponding reference value, as well as an offset between transmission rate of a CQI and a corresponding reference value, respectively. The specific meaning of the $\beta_{offset}^{HARQ-ACK}$, the $\beta_{offset}^{RI}$ and the $\beta_{offset}^{CQI}$ can be found in TS36.213 and TS36.212.

Specifically, according to one aspect of the present disclosure, wherein an index of each first offset of the M first offset(s) in a corresponding offset set is related to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

In one embodiment, the user case includes enhanced Mobile BroadBand (eMBB), Ultra-Reliable and Low Latency Communications (URLLC) and massive Machine-Type Communications (mMTC).

In one subembodiment of the above embodiment, the M first offset(s) decreases(decrease) as the physical layer transmission reliability required by a user case for the second type bit block gets higher.

In one subembodiment of the above embodiment, when a user case for the second type bit block is URLLC, a given first offset is equal to Y1; when a user case for the second type bit block is eMBB, the given first offset is equal to Y2. The Y1 is less than the Y2, the given first offset is any first offset of the M first offset(s).

In one embodiment, the M first offset(s) increases(increase) as the number of transmissions is on the rise.

In one embodiment, offsets in the M first offset set(s) are sorted in descending order respectively.

In one embodiment, offsets in the M first offset set(s) are sorted in ascending order respectively.

The present disclosure provides a method in a base station used for wireless communication, comprising the following steps:

Step A: transmitting a first signaling; and

Step B: receiving a first radio signal;

Herein, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

In one embodiment, REs occupied by any first type sub-signal of the M first type sub-signal(s) in time-frequency domain and REs occupied by the second type sub-signal in time-frequency domain are non-overlapping.

In one embodiment, REs respectively occupied by any two different first type sub-signals of the M first type sub-signals in time-frequency domain are non-overlapping.

In one embodiment, the first radio signal comprises uplink data and UCI.

In one embodiment, the M first type bit block(s) comprises(comprise) UCI respectively.

In one embodiment, the second type bit block comprises uplink data.

Specifically, according to one aspect of the present disclosure, wherein the number of REs occupied by the first radio signal in time-frequency domain is used to determine the M reference value(s).

Specifically, according to one aspect of the present disclosure, wherein the number of REs occupied by a second radio signal in time-frequency domain is used to determine the M reference value(s); the second radio signal carries the second type bit block; the second radio signal is an initial transmission of the second type bit block, the first radio signal is a retransmission of the second type bit block.

In one embodiment, the second radio signal comprises at least the former of uplink data and UCI.

Specifically, according to one aspect of the present disclosure, wherein the Step A and the Step B further comprise the following steps:

Step A0: transmitting a second signaling; and

Step B0: receiving the second radio signal;

Herein, the second signaling comprises scheduling information of the second radio signal.

Specifically, according to one aspect of the present disclosure, wherein the first signaling is used to determine M first offset(s), the M first type value(s) corresponds(correspond) to the M first offset(s) respectively, any first type value of the M first type value(s) is linearly correlated to a corresponding first offset.

In one embodiment, any first type value of the M first type value(s) is equal to a product of a corresponding first offset and a corresponding reference value.

Specifically, according to one aspect of the present disclosure, wherein the first signaling is used to determine a second offset, the M first type value(s) is(are) linearly correlated to the second offset respectively.

In one embodiment, any first value of the M first type value(s) is equal to a product of a corresponding reference value and a corresponding first offset further multiplied by the second offset.

In one embodiment, any first value of the M first type value(s) is equal to a corresponding reference value multiplied by a sum of a corresponding first offset and the second offset.

Specifically, according to one aspect of the present disclosure, wherein the Step A further comprises the following step:

Step A1: transmitting a first downlink signaling;

Herein, the first downlink signaling is used to determine M offset set(s), any offset set of the M offset set(s) comprises a positive integer number of offset(s), the M first offset(s) belongs(belong) to M offset set(s) respectively.

Specifically, according to one aspect of the present disclosure, wherein the Step A further comprises the following step:

Step A2: transmitting a second downlink signaling;

Herein, the second downlink signaling is used to determine M first offset(s), the M first type value(s) corresponds (correspond) to the M first offset(s) respectively, any first type value of the M first type value(s) is linearly correlated to a corresponding first offset.

Specifically, according to one aspect of the present disclosure, wherein an index of each first offset of the M first offset(s) in a corresponding offset set is related to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

The present disclosure provides a UE used for wireless communication, comprising:

a first receiver, receiving a first signaling; and a first transmitter, transmitting a first radio signal;

wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

In one embodiment, the above UE used for wireless communication is characterized in that the number of REs occupied by the first radio signal in time-frequency domain is used to determine the M reference value(s).

In one embodiment, the above UE used for wireless communication is characterized in that the number of REs occupied by a second radio signal in time-frequency domain is used to determine the M reference value(s). The second radio signal carries the second type bit block. The second radio signal is an initial transmission of the second type bit block, the first radio signal is a retransmission of the second type bit block.

In one embodiment, the above UE used for wireless communication is characterized in that the first receiver further receives a second signaling, the first transmitter further transmits the second radio signal. Herein, the second signaling comprises scheduling information of the second radio signal.

In one embodiment, the above UE used for wireless communication is characterized in that the first signaling is used to determine M first offset(s), the M first type value(s) corresponds(correspond) to the M first offset(s) respectively, any first type value of the M first type value(s) is linearly correlated to a corresponding first offset.

In one embodiment, the above UE used for wireless communication is characterized in that the first receiver further receives a first downlink signaling. Herein, the first downlink signaling is used to determine M offset set(s), any offset set of the M offset set(s) comprises a positive integer number of offset(s), the M first offset(s) belongs(belong) to the M offset set(s) respectively.

In one embodiment, the above UE used for wireless communication is characterized in that the first receiver further receives a second downlink signaling. Herein, the second downlink signaling is used to determine M first offset(s), the M first type value(s) corresponds(correspond) to the M first offset(s) respectively, any first type value of the M first type value(s) is linearly correlated to a corresponding first offset.

In one embodiment, the above UE used for wireless communication is characterized in that each first offset of the M first offset(s) in a corresponding offset set is equal to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

The present disclosure provides a base station used for wireless communication, comprising:

a second transmitter, transmitting a first signaling; and a second receiver, receiving a first radio signal;

wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

In one embodiment, the above base station used for wireless communication is characterized in that the number of REs occupied by the first radio signal is used to determine the M reference value(s).

In one embodiment, the above base station used for wireless communication is characterized in that the number of REs occupied by a second radio signal is used to determine the M reference value(s). The second radio signal carries the second type bit block. The second radio signal is an initial transmission of the second type bit block, the first radio signal is a retransmission of the second type bit block.

In one embodiment, the above base station used for wireless communication is characterized in that the second transmitter further transmits a second signaling, the second receiver further receives the second radio signal. Herein, the second signaling comprises scheduling information of the second radio signal.

In one embodiment, the above base station used for wireless communication is characterized in that the first signaling is used to determine M first offset(s), the M first type value(s) corresponds(correspond) to the M first offset(s) respectively, any first type value of the M first type value(s) is linearly correlated to a corresponding first offset.

In one embodiment, the above base station used for wireless communication is characterized in that the first signaling is used to determine a second offset, the M first type value(s) is(are) linearly correlated to the second offset respectively.

In one embodiment, the above base station used for wireless communication is characterized in that the second transmitter further transmits a first downlink signaling. Herein, the first downlink signaling is used to determine M offset set(s), any offset set of the M offset set(s) comprises a positive integer number of offset(s), the M first offset(s) belongs(belong) to the M offset set(s) respectively.

In one embodiment, the above base station used for wireless communication is characterized in that the second transmitter further transmits a second downlink signaling. Herein, the second downlink signaling is used to determine M first offset(s), the M first type value(s) corresponds (correspond) to the M first offset(s) respectively, any first type value of the M first type value(s) is linearly correlated to a corresponding first offset.

In one embodiment, the above base station used for wireless communication is characterized in that each first offset of the M first offset(s) in a corresponding offset set is equal to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

In one embodiment, the present disclosure has the following advantages over conventional schemes:

When UCI and uplink data are transmitted simultaneously in the form of multiplexing on an uplink physical layer data channel, a base station can dynamically adjust the number of REs occupied by UCI on the uplink physical layer data channel via a physical layer signaling, thereby controlling transmission reliability of the UCI in a flexible manner.

When UCI is multiplexed with uplink data in various application scenarios, whatever the physical layer transmission reliability of uplink data is, a base station will be able to ensure the stability of UCI transmission reliability by changing the offset between UCI transmission rate and MCS of uplink data.

When UCI is multiplexed with retransmitted uplink data and a channel for retransmission does not match with a channel for the first transmission, a base station will be able to ensure sufficiently high UCI transmission reliability by changing the offset between UCI transmission rate and MCS of uplink data.

The offset between UCI transmission rate and MCS of uplink data is jointly determined by a higher-layer signaling and a physical layer signaling, therefore, transmission reliability of UCI can be controlled flexibly and excessive physical layer signaling overhead can be avoided.

BRIEF DESCRIPTION OF THE DRAWINGS

Other features, objects and advantages of the present disclosure will become more apparent from the detailed description of non-restrictive embodiments taken in conjunction with the following drawings:

FIG. 3 illustrates a schematic diagram of a method of calculation of the number of REs occupied by M first type sub-signal(s) in time-frequency domain according to one embodiment of the present disclosure;

DESCRIPTION OF THE EMBODIMENTS

Embodiment 1

Figure 1:
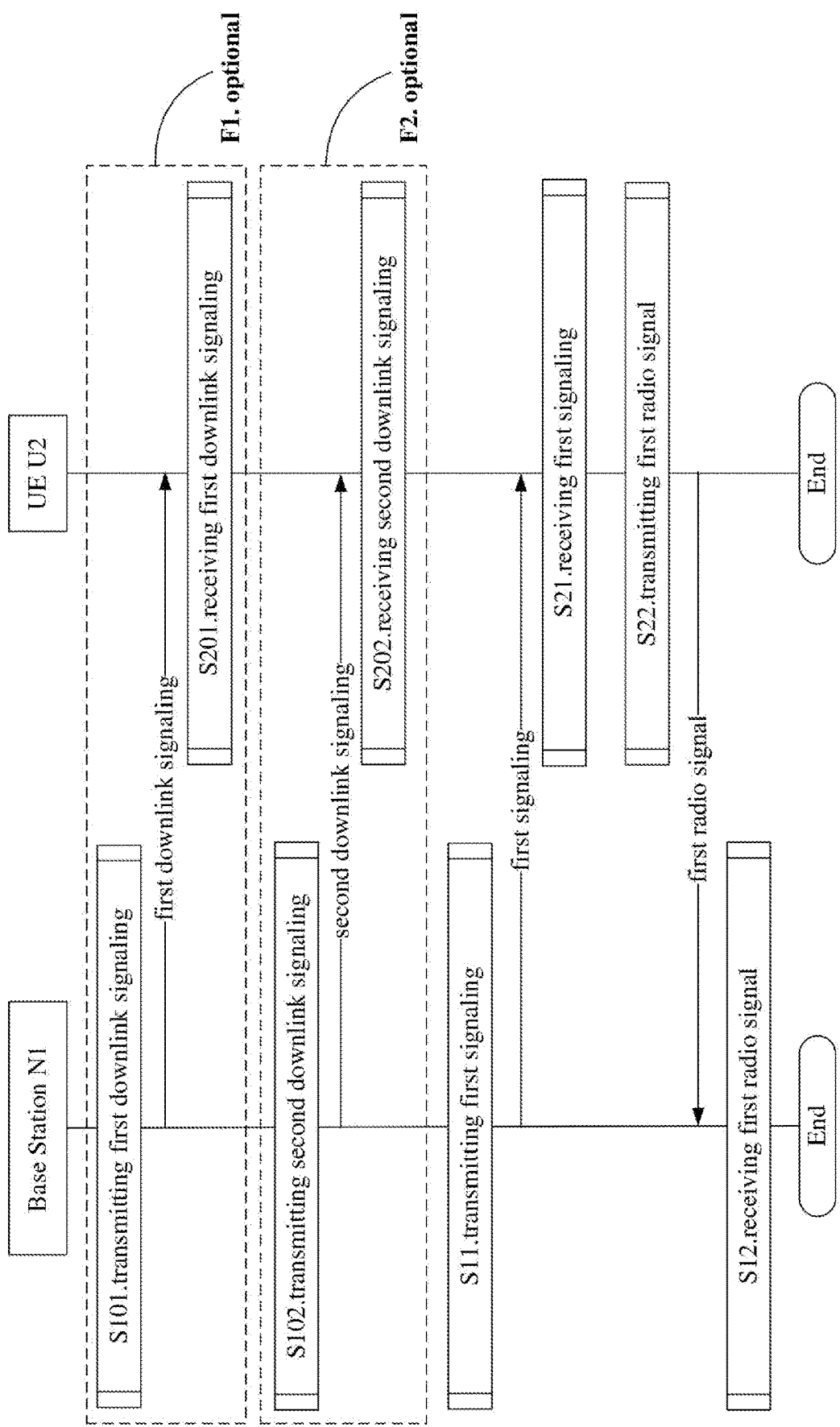
FIG. 1 illustrates a flowchart of wireless transmission according to one embodiment of the present disclosure.

Embodiment 1 illustrates a flowchart of wireless transmission, as shown in FIG. 1. In FIG. 1, a base station N1 is a maintenance base station for a serving cell of a UE U2. In FIG. 1, steps in box F1 and box F2 are optional, respectively. Box F1 and box F2 cannot exist at the same time.

The base station N1 transmits a first downlink signaling in step S101; transmits a second downlink signaling in step S102; transmits a first signaling in step S11; and receives a first radio signal in step S12.

The UE U2 receives a first downlink signaling in step S201; receives a second downlink signaling in step S202; receives a first signaling in step S22; and transmits a first radio signal in step S22.

In Embodiment 1, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block. M first type value(s) is(are) respectively used by the UE U2 to determine a number of Resource Elements (REs) occupied by the M first type sub-signal(s) in time-frequency domain. The M first type value(s) corresponds(correspond) to M reference value(s) respectively, the first signaling is used by the UE U2 to determine a ratio of each first type value of the M first type value(s) to a corresponding reference value. The M is a positive integer. The M first type value(s) corresponds (correspond) to M first offset(s) respectively, any first type value of the M first type value(s) is linearly correlated to a corresponding first offset. The first downlink signaling is used by the UE U2 to determine M offset set(s), any offset set of the M offset set(s) comprises a positive integer number of offset(s), the M first offset(s) belongs(belong) to the M offset set(s) respectively. The second downlink signaling is used by the UE U2 to determine the M first offset(s).

In one embodiment, the REs occupy duration time of a broadband symbol in time domain, and occupy a subcarrier bandwidth in frequency domain.

In one subembodiment of the above embodiment, the broadband symbol is an OFDM symbol.

In one subembodiment of the above embodiment, the broadband symbol is a DFT-S-OFDM symbol.

In one subembodiment of the above embodiment, the broadband symbol is an FBMC symbol.

In one embodiment, REs occupied by any first type sub-signal of the M first type sub-signal(s) in time-frequency domain and those occupied by the second type sub-signal in time-frequency domain are non-overlapping.

In one embodiment, REs occupied by any two different first type sub-signals of the M first type sub-signals in time-frequency domain are non-overlapping.

In one embodiment, the first signaling is a physical layer signaling.

In one embodiment, the first signaling is a dynamic signaling.

In one embodiment, the first signaling is a dynamic signaling used for uplink grant.

In one embodiment, the first signaling is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one embodiment, the scheduling information includes at least one of a time domain resource occupied, a frequency domain resource occupied, an MCS, a HARQ process number, an RV or an NDI.

In one embodiment, the first radio signal comprises uplink data and uplink control information (UCI).

In one embodiment, the first radio signal is transmitted on an uplink physical layer data channel (i.e., an uplink channel that can be used for bearing physical layer data).

In one subembodiment of the above embodiment, the uplink physical layer data channel is a PUSCH.

In one subembodiment, the uplink physical layer data channel is an sPUSCH.

In one embodiment, the M first type bit block(s) comprises(comprise) UCI respectively.

In one subembodiment of the above embodiment, the UCI includes at least one of HARQ-ACK, CSI, an RI, a CQI, a PMI, or a CRI.

In one embodiment, the second type bit block comprises uplink data.

In one embodiment, a given radio signal carrying a given bit block refers to: the given radio signal is an output after the given bit block is sequentially subjected to Channel Coding, a Modulation Mapper, a Layer Mapper, Precoding, a Resource Element Mapper, and Broadband Symbol Generation.

In one embodiment, a given radio signal carrying a given bit block refers to: the given radio signal is an output after the given bit block is sequentially subjected to Channel Coding, a Modulation Mapper, a Layer Mapper, a transform precoder, Precoding, a Resource Element Mapper, and Broadband Symbol Generation.

In one embodiment, a given radio signal carrying a given bit block refers to: the given bit block is used to generate the given radio signal.

In one embodiment, the number of REs occupied by the first radio signal in time-frequency domain is used by the UE U2 to determine the M reference value(s).

In one embodiment, the first radio signal is an initial transmission of the second type bit block.

In one embodiment, M3 first type bit block(s) is(are) a subset of the M first type bit block(s), for any given first type bit block of the M3 first type bit block(s), the given first bit block comprises a given first type information bit block and a given first type check bit block, the given first type check bit block is a CRC bit block of the given first type information bit block. The M3 is a non-negative integer less than or equal to the M.

In one subembodiment of the above embodiment, the M3 is equal to 0.

In one subembodiment of the above embodiment, the M3 is equal to the M.

In one subembodiment of the above embodiment, the M3 is less than the M.

In one embodiment, the first signaling comprises a second field and a third field, a second field of the first signaling indicates at least the former of an MCS and an RV of the second type sub-signal, a third field of the first signaling indicates a time-frequency resource occupied by the first radio signal. A second field of the first signaling and a third field of the first signaling are used by the UE U2 to determine the number of bits in the second type bit block.

In one embodiment, the M first offset(s) is(are) respectively positive real number(s) not less than 1.

In one embodiment, the M first offset(s) is(are) respectively positive real number(s).

In one embodiment, a linear coefficient between any first type value of the M first type value(s) and a corresponding first offset is a positive real number.

In one embodiment, any first type value of the M first type value(s) is equal to a product of a corresponding first offset and a corresponding reference value.

In one embodiment, at least two first offsets out of the M first offsets are unequal, the M is a positive integer greater than 1.

In one embodiment, the first signaling is used by the UE U2 to determine the M first offset(s).

In one subembodiment of the above embodiment, the first signaling explicitly indicates the M first offset(s).

In one subembodiment of the above embodiment, the first signaling implicitly indicates the M first offset(s).

In one embodiment, the first signaling is used by the UE U2 to determine a second offset, the M first type value(s) is(are) linearly correlated to the second offset respectively.

In one subembodiment of the above embodiment, the second offset is a positive real number.

In one subembodiment of the above embodiment, linear coefficient(s) between the M first type value(s) and the second offset is(are) positive real number(s) respectively.

In one subembodiment of the above embodiment, any first type value of the M first type value(s) is equal to a product of a corresponding reference value and a corresponding first offset further multiplied by the second offset.

In one subembodiment of the above embodiment, any first type value of the M first type value(s) is equal to a corresponding reference value multiplied by a sum of a corresponding first offset and the second offset.

In one subembodiment of the above embodiment, the first signaling explicitly indicates the second offset.

In one subembodiment of the above embodiment, the first signaling implicitly indicates the second offset.

In one embodiment, the first downlink signaling is a higher-layer signaling.

In one subembodiment of the above embodiment, the first downlink signaling is an RRC signaling.

In one embodiment, the first downlink signaling is semi-statically configured.

In one embodiment, the first downlink signaling is UE-specific.

In one embodiment, the first signaling explicitly indicates an index of each first offset of the M first offset(s) in a corresponding offset set.

In one embodiment, the first signaling implicitly indicates an index of each first offset of the M first offset(s) in a corresponding offset set.

In one embodiment, indices of the M first offsets in the M offset sets are equal.

In one embodiment, any two offset sets of the M offset sets comprise an equal number of offsets.

In one embodiment, at least two offset sets of the M offset sets comprise different numbers of offsets.

In one embodiment, the second downlink signaling is a higher-layer signaling.

In one subembodiment of the above embodiment, the second downlink signaling is an RRC signaling.

In one embodiment, the second downlink signaling is semi-statically configured.

In one embodiment, the second downlink signaling is UE-specific.

In one embodiment, X1 first offset(s) out of the M first offset(s) is(are) $\beta_{offset}^{HARQ-ACK}$, X2 first offset(s) out of the M first offset(s) is(are) $\beta_{offset}^{RI}$, X3 first offset(s) out of the M first offset(s) is(are) $\beta_{offset}^{CQI}$, the X1, the X2 and the X3 are respectively non-negative integers not greater than the M, a sum of the X1, the X2 and the X3 is equal to the M. The $\beta_{offset}^{HARQ-ACK}$, the $\beta_{offset}^{RI}$, and the $\beta_{offset}^{CQI}$ are an offset between transmission rate of HARQ-ACK and a corresponding reference value, an offset between transmission rate of an RI/CRI and a corresponding reference value, as well as an offset between transmission rate of a CQI and a corresponding reference value, respectively. The specific meaning of the $\beta_{offset}^{HARQ-ACK}$, the $\beta_{offset}^{RI}$ and the $\beta_{offset}^{CQI}$ can be found in TS36.213 and TS36.212.

In one embodiment, an index of each first offset of the M first offset(s) in a corresponding offset set is related to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

In one subembodiment of the above embodiment, the user case includes eMBB, URLLC and mMTC.

In one subembodiment of the above embodiment, the M first offset(s) decreases(decrease) as the physical layer transmission reliability required by a user case for the second type bit block gets higher.

In one subembodiment of the above embodiment, when a user case for the second type bit block is URLLC, a given first offset is equal to Y1; when a user case for the second type bit block is eMBB, the given first offset is equal to Y2. The Y1 is less than the Y2, the given first offset is any first offset of the M first offset(s).

In one embodiment, the M first offset(s) increases(increase) as the number of transmissions is on the rise.

In one embodiment, offsets in the M first offset set(s) are sorted in descending order respectively.

In one embodiment, offsets in the M first offset set(s) are sorted in ascending order respectively.

In one embodiment, the box F1 in FIG. 1 exists, while the box F2 in FIG. 1 does not exist.

In one embodiment, the box F1 in FIG. 1 does not exist, while the box F2 in FIG. 1 exists.

In one embodiment, neither of the box F1 and the box F2 in FIG. 1 exists.

Embodiment 2

Figure 2:
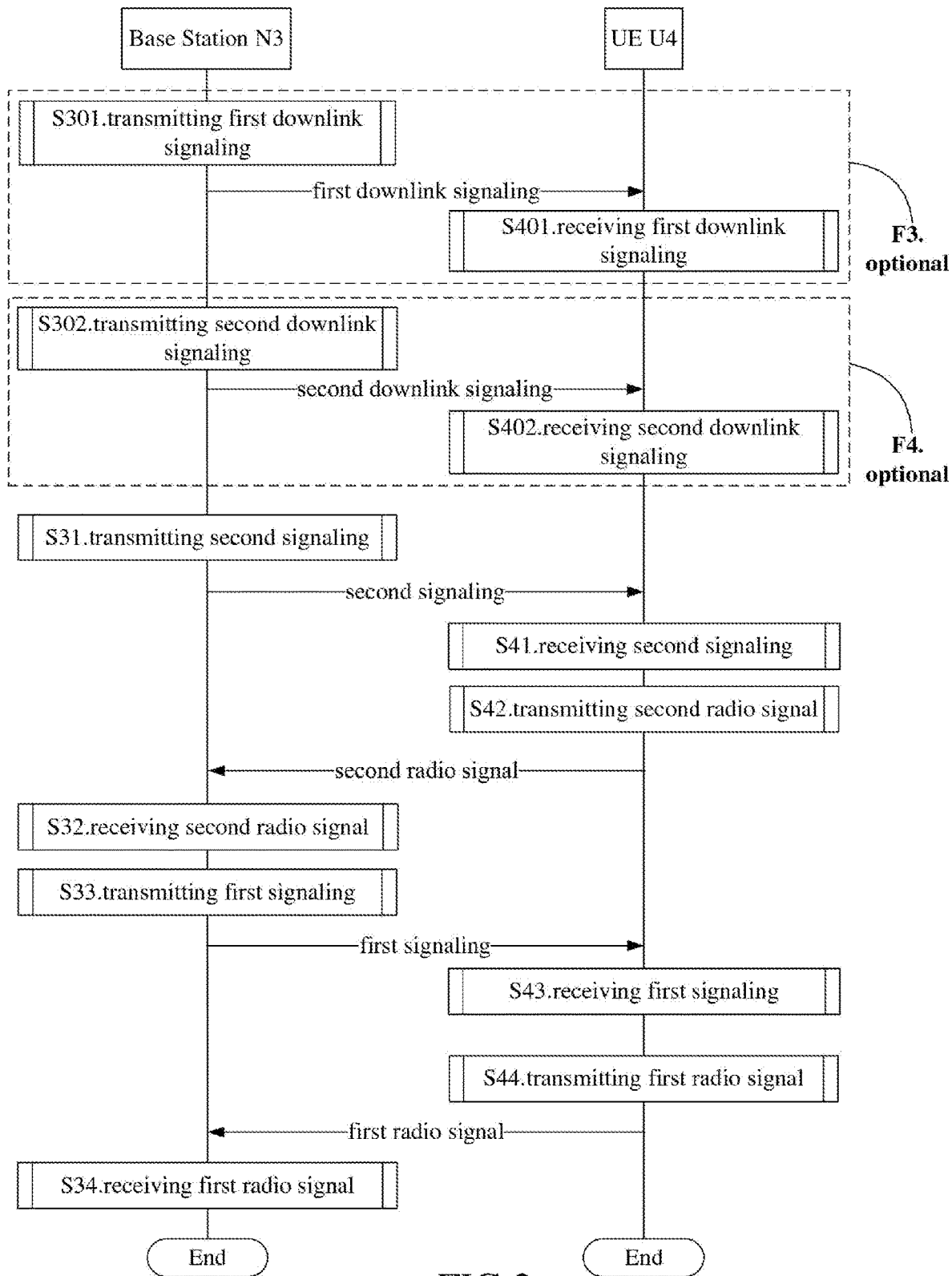
FIG. 2 illustrates a flowchart of wireless transmission according to another embodiment of the present disclosure.

Embodiment 2 illustrates a flowchart of wireless transmission, as shown in FIG. 2. In FIG. 2, a base station N3 is a maintenance base station for a serving cell of a UE U4. In FIG. 2, steps in boxes F3 and F4 are optional, respectively. The box F3 and the box F4 cannot exist at the same time.

The base station N3 transmits a first downlink signaling in step S301; transmits a second downlink signaling in step S302; transmits a second signaling in step S31; receives a second radio signal in step S32; transmits a first signaling in step S33; and receives a first radio signal in step S34.

The UE U4 receives a first downlink signaling in step S401; receives a second downlink signaling in step S402; receives a second signaling in step S41; transmits a second radio signal in step S42; receives a first signaling in step S43; and transmits a first radio signal in step S44.

In Embodiment 2, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block. M first type value(s) is(are) respectively used by the UE U4 to determine a number of REs occupied by the M first type sub-signal(s) in time-frequency domain. The M first type value(s) corresponds(correspond) to M reference value(s) respectively, the first signaling is used by the UE U4 to determine a ratio of each first type value of the M first type value(s) to a corresponding reference value. The M is a positive integer. The second radio signal carries the second type bit block. The second radio signal is an initial transmission of the second type bit block, the first radio signal is a retransmission of the second type bit block. The second signaling comprises scheduling information of the second radio signal. The M first type value(s) corresponds(correspond) to M first offset(s) respectively, any first type value of the M first type value(s) is linearly correlated to a corresponding first offset. The first downlink signaling is used by the UE U4 to determine M offset set(s), any offset set of the M offset set(s) comprises a positive integer number of offset(s), the M first offset(s) belongs(belong) to the M offset set(s) respectively. The second downlink signaling is used by the UE U4 to determine the M first offset(s).

In one embodiment, the number of REs occupied by a second radio signal in time-frequency domain is used by the UE U4 to determine the M reference value(s).

In one embodiment, a time domain resource occupied by the second radio signal is prior to a time domain resource occupied by the first radio signal.

In one embodiment, the second radio signal comprises at least one of uplink data and UCI.

In one embodiment, the second radio signal is transmitted on an uplink physical layer data channel (i.e., an uplink channel that can be used for bearing physical layer data).

In one subembodiment of the above embodiment, the uplink physical layer data channel is a PUSCH.

In one subembodiment of the above embodiment, the uplink physical layer data channel is an sPUSCH.

In one embodiment, an RV of the second radio signal is different from that of the first radio signal.

In one embodiment, an NDI for the second radio signal is different from that for the first radio signal.

In one embodiment, the first radio signal and the second radio signal correspond to a same HARQ process number.

In one embodiment, a time domain resource occupied by the second signaling is prior to a time domain resource occupied by the first signaling.

In one embodiment, the second signaling is a physical layer signaling.

In one embodiment, the second signaling is a dynamic signaling.

In one embodiment, the second signaling is a dynamic signaling used for uplink grant.

In one embodiment, the second signaling is transmitted on a downlink physical layer control channel (i.e., a downlink channel that can only be used for bearing a physical layer signaling).

In one subembodiment of the above embodiment, the downlink physical layer control channel is a PDCCH.

In one subembodiment of the above embodiment, the downlink physical layer control channel is an sPDCCH.

In one subembodiment of the above embodiment, the downlink physical layer control channel is an NR-PDCCH.

In one embodiment, the second signaling comprises a second field and a third field, a second field of the second signaling indicates at least the former of an MCS and an RV of uplink data in the second radio signal, a third field of the second signaling indicates a time-frequency resource occupied by the second radio signal. A second field of the second signaling and a third field of the second signaling are used by the UE U4 to determine the number of bits in the second type bit block.

In one embodiment, the box F3 in FIG. 2 exists, while the box F4 in FIG. 2 does not exist.

In one embodiment, the box F3 in FIG. 2 does not exist, while the box F4 in FIG. 2 exists.

In one embodiment, neither of the box F3 and the box F4 in FIG. 2 exists.

Embodiment 3

Embodiment 3 illustrates a schematic diagram of a method of calculation of the number of REs occupied by M first type sub-signal(s) in time-frequency domain, as shown in FIG. 3.

In Embodiment 3, the first radio signal in the present disclosure comprises M first type sub-signal(s) and a second type sub-signal, the M first type sub-signal(s) carries(carry) M first type bit block(s) respectively, the second type sub-signal carries a second type bit block. The second type bit block comprises a second type information bit block and a second type check bit block, the second type check bit block is a CRC bit block of the second type information bit block. M first type value(s) is(are) respectively used to determine a number(numbers) of REs occupied by the M first type sub-signal(s) in time-frequency domain. The M first type value(s) corresponds(correspond) to M reference value(s) respectively, the first signaling in the present disclosure is used to determine a ratio of each first type value of the M first type value(s) to a corresponding reference value. Any reference value of the M reference value(s) is equal to a ratio of the number of REs occupied by the first radio signal in time-frequency domain to the number of bits in the second type bit block. The M first type value(s) corresponds(correspond) to M first offset(s) respectively, any first type value of the M first type value(s) is linearly correlated to a corresponding first offset. The M first type sub-signal(s) corresponds(correspond) to M first limit value(s) respectively.

In FIG. 3, indices for the M first type sub-signal(s), the M first type bit block(s), the M first type value(s), the M reference value(s), the M first offset(s) and the M first limit value(s) are #0, #1, #2 . . . and #M−1, respectively. A first type sub-signal #i carries a first type bit block #i, a first type value #i is used to determine a number of REs occupied by a first type sub-signal #i in time-frequency domain, a first type value #i corresponds to a reference value #i, a first type value #i corresponds to a first offset #i, a first type sub-signal #i corresponds to a first type limit value #i. The i is a non-negative integer less than M.

In one embodiment, the first radio signal is an initial transmission of the second type bit block.

In one embodiment, a CRC bit block of a given bit block refers to an output after the given bit block is subjected to CRC cyclic generator polynomial. A polynomial consisting of the given bit block and a CRC bit block of the given bit block can be divided by the CRC cyclic generator polynomial on GF(2), namely, the polynomial consisting of the given bit block and a CRC bit block of the given bit block yields a remainder equal to 0 when divided by the CRC Cyclic Generator Polynomial.

In one embodiment, the M first offset(s) is(are) positive real number(s) not less than 1, respectively.

In one embodiment, the M first offset(s) is(are) positive real number(s) respectively.

In one embodiment, a linear coefficient between any first type value of the M first type value(s) and a corresponding first offset is a positive real number.

In one embodiment, at least two first offsets out of the M first offsets are unequal, the M is a positive integer greater than 1.

In one embodiment, any first type value of the M first type value(s) is equal to a product of a corresponding first offset and a corresponding reference value.

In one embodiment, the M first type value(s) is(are) linearly correlated to the second offset respectively.

In one subembodiment of the above embodiment, the second offset is a positive real number.

In one subembodiment of the above embodiment, linear coefficient(s) between the M first type value(s) and the second offset is(are) positive real number(s) respectively.

In one subembodiment of the above embodiment, any first type value of the M first type value(s) is equal to a product of a corresponding reference value and a corresponding first offset further multiplied by the second offset.

In one subembodiment of the above embodiment, any first type value of the M first type value(s) is equal to a corresponding reference value multiplied by a sum of a corresponding first offset and the second offset.

In one embodiment, a number of REs occupied by any first type sub-signal of the M first type sub-signal(s) in time-frequency domain is equal to a minimum value between a corresponding first limit value and a product of a corresponding first type value and a number of bits comprised in a corresponding first type bit block.

In one embodiment, the first type value #i is equal to a product of the first offset #i and the reference value #i, a number of REs occupied by the first type sub-signal #i in time-frequency domain is equal to a minimum value between a product of the first type value #i and a number of bits comprised in the first type bit block #i and the first limit value #i. The i is a non-negative integer less than M, the first limit value #i is equal to a number of subcarriers occupied by the first radio signal in frequency domain multiplied by 4. A formula is described as follows:

$$Q' = \min\left(\left\lceil \frac{O \cdot M_{sc}^{PUSCH-initial} \cdot N_{symb}^{PUSCH-initial} \cdot \beta_1}{\sum_{r=0}^{C-1} K_r} \right\rceil, 4 \cdot M_{sc}^{PUSCH}\right)$$

$$\frac{M_{sc}^{PUSCH-initial} \cdot N_{symb}^{PUSCH-initial} \cdot \beta_1}{\sum_{r=0}^{C-1} K_r} \text{ Herein, } Q', O,$$

$$\frac{M_{sc}^{PUSCH-initial} \cdot N_{symb}^{PUSCH-initial}}{\sum_{r=0}^{C-1} K_r}, \beta_1, M_{sc}^{PUSCH-initial} \cdot N_{symb}^{PUSCH-initial}, \sum_{r=0}^{C-1} K_r,$$

and $4 \cdot M_{sc}^{PUSCH}$ respectively refer to the number of REs occupied by the first type sub-signal #i in time-frequency domain, the number of bits comprised in the first type bit block #i, the first type value #i, the reference value #i, the first offset #i, the number of REs occupied by the first radio signal in time-frequency domain, the number of bits in the second type bit block and the first limit value #i. The $M_{sc}^{PUSCH-initial}$, the $N_{symb}^{PUSCH-initial}$, the C and the $K_r$ respectively refer to a number of subcarriers occupied by the first radio signal in frequency domain, a number of broadband symbols occupied by the first radio signal in time domain, a number of code blocks comprised in the second type bit block and a number of bits in the r-th code block in the second type bit block. In this embodiment, the first radio signal is an initial transmission of the second type bit block, so the $M_{sc}^{PUSCH}$ is equal to the $M_{sc}^{PUSCH-initial}$. The specific meaning of Q', the O, the $M_{sc}^{PUSCH-initial}$, the $N_{symb}^{PUSCH-initial}$, the C, the $K_r$ and the $M_{sc}^{PUSCH}$ can be found in TS36.213 and TS36.212.

In one subembodiment of the above embodiment, the first type sub-signal #i carries at least one of HARQ-ACK, an RI or a CRI.

In one embodiment, the first type value #i is equal to a product of the reference value #i and the first offset #i further multiplied by the second offset. The number of REs occupied by the first type sub-signal #i in time-frequency domain is equal to a minimum value between a product of the first type value #i and the number of bits comprised in the first type bit block #i and the first limit value #i. The i is a non-negative integer less than M, the first limit value #i is equal to the number of REs occupied by the first radio signal in time-frequency domain minus a ratio of $Q_{RI}^{(x)}$ to $Q_m^{(x)}$. The formula is described as follows:

$$Q' = \min\left(\left\lceil \frac{(O+L) \cdot M_{sc}^{PUSCH-initial(x)} \cdot N_{symb}^{PUSCH-initial(x)} \cdot \beta_1 \cdot \beta_2}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

$$\frac{M_{sc}^{PUSCH-initial(x)} \cdot N_{symb}^{PUSCH-initial(x)} \cdot \beta_1 \cdot \beta_1}{\sum_{r=0}^{C^{(x)}-1} K_r^{(x)}},$$

Herein, $O + L$, $\frac{M_{sc}^{PUSCH-initial(x)} \cdot N_{symb}^{PUSCH-initial(x)}}{\sum_{r=0}^{C^{(x)}-1} K_r^{(x)}}$, $\beta_2$, $M_{sc}^{PUSCH-initial(x)} \cdot N_{symb}^{PUSCH-initial(x)}$, $\sum_{r=0}^{C^{(x)}-1} K_r^{(x)}$ and $M_{sc}^{PUSCH} \cdot N_{symb}^{PUSCH} - \frac{Q_{RI}^{(x)}}{Q_m^{(x)}}$ respectively refer to the number of bits comprised in the first type bit block #i, the first type value #i, the reference value #i, the second offset, the number of REs occupied by the first radio signal in time-frequency domain, the number of bits in the second type bit block and the first limit value #i. The O, the L, the $M_{sc}^{PUSCH-initial(x)}$, the $N_{symb}^{PUSCH-initial(x)}$, the C(x), the $K_r^{(x)}$, the $Q_{RI}^{(x)}$ and the $Q_m^{(x)}$ respectively refer to a number of information bits in the first type bit block #i, a number of check bits in the first type bit block #i, the number of subcarriers occupied by the first radio signal in frequency domain, the number of broadband symbols occupied by the first radio signal in time domain, the number of code blocks comprised in the second type bit block, the number of bits in the r-th code block in the second type bit block, a parameter relevant to the number of RI/CRI bits carried in the M first type sub-signal(s) and a parameter relevant to the modulation order of the second type sub-signal. The check bits in the first type bit block #i are CRC bits of the information bits in the first type bit block #i. In this embodiment, the first radio signal is an initial transmission of the second type bit block, so the $M_{sc}^{PUSCH}$ is equal to the $M_{sc}^{PUSCH-initial(x)}$, the $N_{symb}^{PUSCH}$ is equal to the $N_{symb}^{PUSCH-initial(x)}$. The specific meaning of the O, the L, the $M_{sc}^{PUSCH-initial(x)}$, the $N_{symb}^{PUSCH-initial(x)}$, the C(x), the $K_r^{(x)}$, the $M_{symb}^{PUSCH}$, the $Q_{RI}^{(x)}$ and the $Q_m^{(x)}$ can be found in TS36.213 and TS36.212.

In one subembodiment of the above embodiment, the first type sub-signal #i carries at least one of a CQI or a PMI.

In one embodiment, the first type value #i is equal to the reference value #i multiplied by a sum of the first offset #i and the second offset. A number of REs occupied by the first type sub-signal #i in time-frequency domain is equal to a minimum value between a product of the first type value #i and a number of bits comprised in the first type bit block #i and the first limit value #i. The i is a non-negative integer less than M, the first limit value #i is equal to a number of subcarriers occupied by the first radio signal in frequency domain multiplied by 4. A formula is described as follows:

$$Q' = \min\left(\left\lceil\frac{O \cdot M_{sc}^{PUSCH-initial} \cdot N_{symb}^{PUSCH-initial} \cdot (\beta_1 + \beta_2)}{\sum_{r=0}^{C-1} K_r}\right\rceil, 4 \cdot M_{sc}^{PUSCH}\right)$$

Herein, $$\frac{M_{sc}^{PUSCH-initial} \cdot N_{symb}^{PUSCH-initial} \cdot (\beta_1 + \beta_2)}{\sum_{r=0}^{C-1} K_r}$$

is the first type value #i.

In one subembodiment of the above embodiment, the first type sub-signal #i carries at least one of HARQ-ACK, an RI, or a CRI.

In one embodiment, the first signaling indicates the M first offset(s).

In one subembodiment of the above embodiment, the M first offset(s) belongs(belong) to M offset set(s) respectively, any offset set of the M offset set(s) comprises a positive integer number of offset(s), the first downlink signaling in the present disclosure is used to determine the M offset set(s), the first signaling indicates an index of each first offset of the M first offset(s) in a corresponding offset set.

In one subembodiment of the above embodiment, the first downlink signaling is a higher-layer signaling.

In one subembodiment of the above embodiment, the first downlink signaling is semi-statically configured.

In one subembodiment of the above embodiment, the first downlink signaling is UE-specific.

In one embodiment, the first signaling indicates the second offset.

In one subembodiment of the above embodiment, the second downlink signaling in the present disclosure is used to determine the M first offset(s).

In a reference embodiment of the above subembodiment, X1 first offset(s) out of the M first offset(s) is(are) $\beta_{offset}^{HARQ-ACK}$, X2 first offset(s) out of the M first offset(s) is(are) $\beta_{offset}^{RI}$, X3 first offset(s) out of the M first offset(s) is(are) $\beta_{offset}^{CQI}$, the X1, the X2 and the X3 are respectively non-negative integers not greater than the M, a sum of the X1, the X2 and the X3 is equal to the M. The $\beta_{offset}^{HARQ-ACK}$, the $\beta_{offset}^{RI}$, and the $\beta_{offset}^{CQI}$ are an offset between transmission rate of HARQ-ACK and a corresponding reference value, an offset between transmission rate of an RI/CRI and a corresponding reference value, as well as an offset between transmission rate of a CQI and a corresponding reference value, respectively. The specific meaning of the $\beta_{offset}^{HARQ-ACK}$, the $\beta_{offset}^{RI}$ and the $\beta_{offset}^{CQI}$ can be found in TS36.213 and TS36.212.

In one subembodiment of the above embodiment, the second offset belongs to an offset group, the offset group comprises a positive integer number of offset(s), the first signaling indicates an index of the second offset in the offset group.

In a reference embodiment of the above subembodiment, the second downlink signaling indicates the offset group.

In one subembodiment of the above embodiment, the second downlink signaling is a higher-layer signaling.

In one subembodiment of the above embodiment, the second downlink signaling is semi-statically configured.

In one subembodiment of the above embodiment, the second downlink signaling is UE-specific.

Embodiment 4

Figure 4:
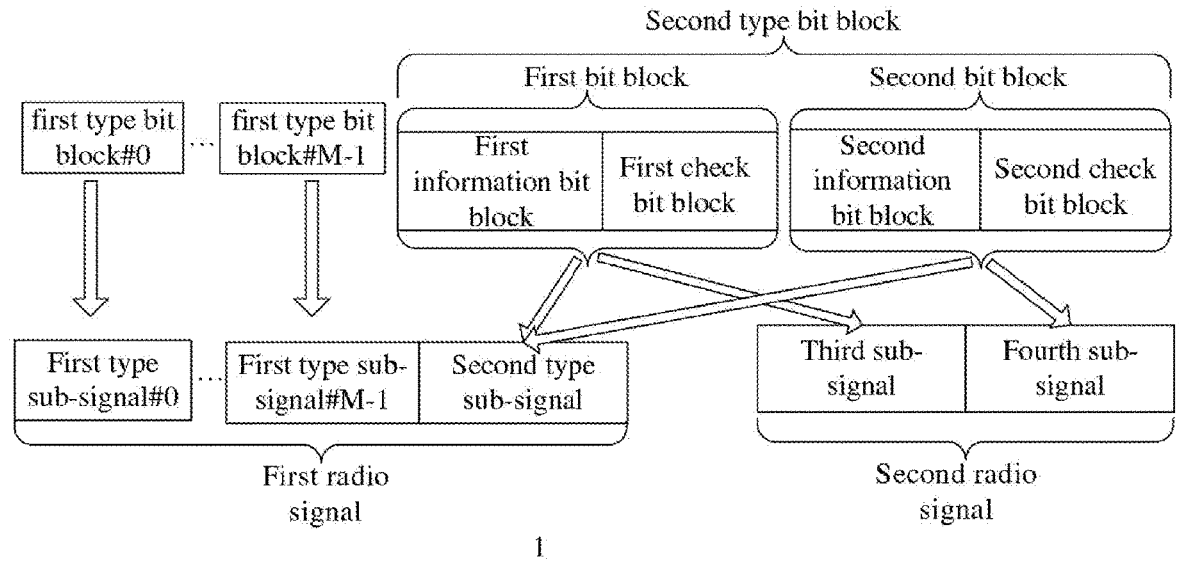
FIG. 4 illustrates a schematic diagram of a method of calculation of the number of REs occupied by M first type sub-signal(s) in time-frequency domain according to another embodiment of the present disclosure.

Embodiment 4 illustrates a schematic diagram of a method of calculation of the number of REs occupied by M first type sub-signal(s) in time-frequency domain, as shown in FIG. 4.

In Embodiment 4, the first radio signal in the present disclosure comprises M first type sub-signal(s) and a second type sub-signal, the M first type sub-signal(s) carries(carry) M first type bit block(s) respectively, the second type sub-signal carries a second type bit block. The second type bit block comprises a first bit block and a second bit block, the first bit block comprises a first information bit block and a first check bit block, the second bit block comprises a second information bit block and a second check bit block. The first check bit block is a CRC bit block of the first information bit block, the second check bit block is a CRC bit block of the second information bit block. M first type value(s) is(are) respectively used to determine a number (numbers) of REs occupied by the M first type sub-signal(s) in time-frequency domain. The M first type value(s) corresponds(correspond) to M reference value(s) respectively, the first signaling in the present disclosure is used to determine a ratio of each first type value of the M first type value(s) to a corresponding reference value. The number of REs occupied by a second radio signal in time-frequency domain is used to determine the M reference value(s). The second radio signal carries the second type bit block. The second radio signal is an initial transmission of the second type bit block, the first radio signal is a retransmission of the second type bit block. The second radio signal comprises a third sub-signal and a fourth sub-signal, the third sub-signal carries the first bit block, the fourth sub-signal carries the second bit block. The M first type value(s) corresponds (correspond) to M first offset(s) respectively, any first type value of the M first type value(s) is linearly correlated to a corresponding first offset. The M first type sub-signal(s) corresponds(correspond) to M first limit value(s) respectively.

M2 reference value(s) of the M reference value(s) is(are) respectively equal to a reciprocal of a sum of the number of bits in the first bit block divided by a number of REs occupied by the third sub-signal in time-frequency domain and the number of bits in the second bit block divided by a number of REs occupied by the fourth sub-signal in time-frequency domain. Reference value(s) of the M reference value(s) not belonging to the M2 reference value(s) is(are) respectively equal to a ratio of a number of REs occupied by a second target sub-signal in time-frequency domain to a number of bits in a second target bit block. The second target sub-signal is one of the third sub-signal and the fourth sub-signal, the second target bit block is one of the first bit block and the second bit block, the second target sub-signal carries the second target bit block. The M2 is a non-negative integer less than or equal to the M.

In FIG. 4, indices for the M first type sub-signal(s), the M first type bit block(s), the M first type value(s), the M reference value(s), the M first offset(s) and the M first limit value(s) are #0, #1, #2 . . . and #M−1, respectively. A first type sub-signal #i carries a first type bit block #i, a first type value #i is used to determine a number of REs occupied by a first type sub-signal #i in time-frequency domain, a first type value #i corresponds to a reference value #i, a first type value #i corresponds to a first offset #i, a first type sub-signal #i corresponds to a first type limit value #i. The i is a non-negative integer less than M.

In one embodiment, the second target sub-signal is one of the third sub-signal and the fourth sub-signal that corresponds to a maximum IMCS, the IMCS indicates MCS of a corresponding radio signal. The specific meaning of the IMCS can be found in TS36.213 and TS36.212.

In one embodiment, the M2 is equal to 0.

In one embodiment, the M2 is equal to the M.

In one embodiment, the M2 is less than the M.

In one embodiment, the second check bit block is not related to the first information bit block, the first check bit block is not related to the second information bit block.

In one embodiment, the M2 reference value(s) corresponds(correspond) to M2 first type sub-signal(s) respectively, the M2 first type sub-signal(s) is(are) a subset of the M first type sub-signal(s). A number of REs occupied by any first type sub-signal of the M2 first type sub-signal(s) in time-frequency domain is equal to a maximum value between a second limit value and a minimum value between a corresponding first limit value and a product of a corresponding first type value and a number of bits comprised in a corresponding first type bit block. The corresponding first limit value is equal to the number of subcarriers occupied by the first radio signal in frequency domain multiplied by 4, the second limit value is equal to $Q'_{min}$, the $Q'_{min}$ is determined by modulation order of the second type sub-signal and the number of bits in the corresponding first type bit block. The specific meaning of the $Q'_{min}$ can be found in TS36.212.

In one subembodiment of the above embodiment, any first type sub-signal of the M2 first type sub-signal(s) carries at least one of HARQ-ACK, an RI or a CRI.

In one embodiment, a number of REs occupied by any first type sub-signal of the M first type sub-signal(s) not belonging to the M2 first type sub-signal(s) in time-frequency domain is equal to a minimum value between a corresponding first limit value and a product of a corresponding first type value and a number of bits comprised in a corresponding first type bit block. The corresponding first limit value is equal to the number of REs occupied by the first radio signal in time-frequency domain minus a ratio of $Q_{RI}^{(x)}$ to $Q_m^{(x)}$. The $Q_{RI}^{(x)}$ is related to a number of bits in RI(s) or CRI(s) carried by the M first type sub-signal(s), the $Q_m^{(x)}$ is related to modulation order of the second type sub-signal. The specific meaning of the $Q_{RI}^{(x)}$ and the $Q_m^{(x)}$ can be found in TS36.212.

In one subembodiment of the above embodiment, any first type sub-signal of the M first type sub-signal(s) not belonging to the M2 first type sub-signal(s) carries at least one of a CQI or a PMI.

In one embodiment, a first type value of the M first type value(s) is equal to a product of a corresponding first offset and a corresponding reference value. A first type sub-signal #i is any first type sub-signal of the M2 first type sub-signal(s). The number of REs occupied by the first type sub-signal #i in time-frequency domain is equal to:

$$Q' = \max\left[\min\left[\frac{\left(\begin{array}{c} O \cdot M_{sc}^{PUSCH-initial(1)} \cdot \\ N_{symb}^{PUSCH-initial(1)} \cdot \\ M_{sc}^{PUSCH-initial(2)} \cdot \\ N_{symb}^{PUSCH-initial(2)} \cdot \beta_1 \end{array}\right)}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}}, 4 \cdot M_{sc}^{PUSCH}\right], Q'\min\right]$$

Herein, $Q'$, $O$, 
$$\frac{M_{sc}^{PUSCH-initial(1)} \cdot N_{symb}^{PUSCH-initial(1)} \cdot}{M_{sc}^{PUSCH-initial(2)} \cdot N_{symb}^{PUSCH-initial(2)} \cdot \beta_1}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}},$$

$$\frac{M_{sc}^{PUSCH-initial(1)} \cdot N_{symb}^{PUSCH-initial(1)} \cdot}{M_{sc}^{PUSCH-initial(2)} \cdot N_{symb}^{PUSCH-initial(2)}}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}},$$

$\beta_1$, $M_{sc}^{PUSCH-initial(1)} \cdot N_{symb}^{PUSCH-initial(1)}$, $\sum_{r=0}^{C^{(1)}-1} K_r^{(1)}$, $M_{sc}^{PUSCH-initial(2)} \cdot N_{symb}^{PUSCH-initial(2)}$, $\sum_{r=0}^{C^{(2)}-1} K_r^{(2)}$, $4 \cdot_{sc}^{PUSCH}$ and $Q'_{min}$ respectively refer to the number of REs occupied by the first type sub-signal #i in time-frequency domain, the number of bits comprised in the first type bit block #i, the first type value #i, the reference value #i, the first offset #i, the number of REs occupied by the third sub-signal in time-frequency domain, the number of bits in the first bit block, the number of REs occupied by the fourth sub-signal in time-frequency domain, the number of bits in the second bit block, the first limit value #i and the second limit value. The $M_{sc}^{PUSCH-initial(1)}$, the $N_{symb}^{PUSCH-initial(1)}$, the $M_{sc}^{PUSCH-initial(2)}$, the $N_{symb}^{PUSCH-initial(2)}$, the $C(1)$, the $K_r^{(1)}$, the $C(2)$, the $K_r^{(2)}$ and the $M_{sc}^{PUSCH}$ respectively refer to a number of subcarriers occupied by the third sub-signal in frequency domain, a number of broadband symbols occupied by the third sub-signal in time domain, a number of subcarriers occupied by the fourth sub-signal in frequency domain, a number of broadband symbols occupied by the fourth sub-signal in time domain, a number of code blocks comprised in the first bit block, a number of bits in the r-th code block of the first bit block, a number of code blocks comprised in the second bit block, a number of bits in the r-th code block in the second bit block, and a number of subcarriers occupied by the first radio signal in frequency domain. The specific meaning of the Q', the O, the $M_{sc}^{PUSCH\text{-}initial(1)}$, the $N_{symb}^{PUSCH\text{-}initial(1)}$, the $M_{sc}^{PUSCH\text{-}initial(2)}$, the $N_{symb}^{PUSCH\text{-}initial(2)}$, the C(1), the $K_r^{(1)}$, the C(2), the $K_r^{(2)}$, the SC, and the $Q'_{min}$ can be found in TS36.213 and TS36.212.

In one embodiment, the M first type value(s) is(are) linearly correlated to a second offset respectively. A first type value of the M first type value(s) is equal to a product of a corresponding reference value and a corresponding first offset further multiplied by the second offset. A first type sub-signal #i is any first type sub-signal of the M first type sub-signal(s) not belonging to the M2 first type sub-signal(s). A number of REs occupied by the first type sub-signal #i in time-frequency domain is equal to:

$$Q' = \min\left(\left\lceil \frac{(O+L) \cdot M_{sc}^{PUSCH\text{-}initial(x)} \cdot N_{symb}^{PUSCH\text{-}initial(x)} \cdot \beta_1 \cdot \beta_2}{\sum_{r=0}^{C^{(x)}-1} K_r^{(x)}} \right\rceil, M_{sc}^{PUSCH} \cdot N_{symb}^{PUSCH} - \frac{Q_{RI}^{(x)}}{Q_m^{(x)}}\right)$$

$$\frac{M_{sc}^{PUSCH\text{-}initial(x)} \cdot N_{symb}^{PUSCH\text{-}initial(x)} \cdot \beta_1 \cdot \beta_1}{\sum_{r=0}^{C^{(x)}-1} K_r^{(x)}} \text{ Herein,}$$

-continued $O+L$, $\dfrac{M_{sc}^{PUSCH\text{-}initial(x)} \cdot N_{symb}^{PUSCH\text{-}initial(x)}}{\sum_{r=0}^{C^{(x)}-1} K_r^{(x)}}$, $\beta_2$, $M_{sc}^{PUSCH\text{-}initial(x)} \cdot N_{symb}^{PUSCH\text{-}initial(x)} \sum_{r=0}^{C^{(x)}-1} K_r^{(x)}$ and $M_{sc}^{PUSCH} \cdot N_{symb}^{PUSCH} - \dfrac{Q_{RI}^{(x)}}{Q_m^{(x)}}$ respectively refer to the number of bits comprised in the first type bit block #i, the first type value #i, the reference value #i, the second offset, a number of REs occupied by the second target sub-signal in time-frequency domain, a number of bits in the second target bit block and the first limit value #i. The O, the L, the $M_{sc}^{PUSCH\text{-}initial(x)}$, the $N_{symb}^{PUSCH\text{-}initial(x)}$, the C(x), the $K_r^{(x)}$, the $M_{sc}^{PUSCH}$, the $N_{symb}^{PUSCH}$, the $Q_{RI}^{(x)}$, and the $Q_m^{(x)}$ respectively refer to a number of information bits in the first type bit block #i, a number of check bits in the first type bit block #i, the number of subcarriers occupied by the second target sub-signal in frequency domain, the number of broadband symbols occupied by the second target sub-signal in time domain, the number of code blocks comprised in the second target bit block, the number of bits in the r-th code block in the second target bit block, the number of subcarriers occupied by the first radio signal in frequency domain, the number of broadband symbols occupied by the first radio signal in time domain, a parameter relevant to the number of RI/CRI bits carried in the M first type sub-signal(s) and a parameter relevant to the modulation order of the second type sub-signal. The check bit in the first type bit block #i is a CRC bit of the information bit in the first type bit block #i. In this embodiment, the first radio signal is an initial transmission of the second type bit block, so the $M_{sc}^{PUSCH}$ is equal to the $M_{sc}^{PUSCH\text{-}initial(x)}$, the $N_{symb}^{PUSCH}$ is equal to the $N_{symb}^{PUSCH\text{-}initial(x)}$. The specific meaning of the O, the L, the $M_{sc}^{PUSCH\text{-}initial(x)}$, the $N_{symb}^{PUSCH\text{-}initial(x)}$, the C(x), the $K_r^{(x)}$, the $N_{symb}^{PUSCH}$, the $Q_{RI}^{(x)}$ and the $Q_m^{(x)}$ can be found in TS36.213 and TS36.212.

In one embodiment, the M first type value(s) is(are) linearly correlated to a second offset respectively. A first type value of the M first type value(s) is equal to a corresponding reference value multiplied by a sum of a corresponding first offset and the second offset. A first type sub-signal #i is any first type sub-signal of the M2 first type sub-signal(s). The number of REs occupied by the first type sub-signal #i in time-frequency domain is equal to:

$$Q' = \max\left[\min\left(\dfrac{O \cdot M_{sc}^{PUSCH\text{-}initial(1)} \cdot N_{symb}^{PUSCH\text{-}initial(1)} \cdot}{\sum_{r=0}^{C^{(1)}-1} K_r^{(1)} \cdot M_{sc}^{PUSCH\text{-}initial(2)} \cdot N_{symb}^{PUSCH\text{-}initial(2)} +} \dfrac{M_{sc}^{PUSCH\text{-}initial(2)} \cdot N_{symb}^{PUSCH\text{-}initial(2)} \cdot (\beta_1 + \beta_2)}{\sum_{r=0}^{C^{(2)}-1} K_r^{(2)} \cdot M_{sc}^{PUSCH\text{-}initial(1)} \cdot N_{symb}^{PUSCH\text{-}initial(1)}}, 4 \cdot M_{sc}^{PUSCH}\right), Q'\min\right]$$

Herein, $\dfrac{M_{sc}^{PUSCH\text{-}initial(1)} \cdot N_{symb}^{PUSCH\text{-}initial(1)} \cdot M_{sc}^{PUSCH\text{-}initial(2)} \cdot N_{symb}^{PUSCH\text{-}initial(2)} \cdot (\beta_1 + \beta_2)}{\sum_{r=0}^{C^{(1)}-1} K_r^{(1)} \cdot M_{sc}^{PUSCH\text{-}initial(2)} \cdot N_{symb}^{PUSCH\text{-}initial(2)} + \sum_{r=0}^{C^{(2)}-1} K_r^{(2)} \cdot M_{sc}^{PUSCH\text{-}initial(1)} \cdot N_{symb}^{PUSCH\text{-}initial(1)}}$ refers to the first type value #i.

Embodiment 5

Figure 5:
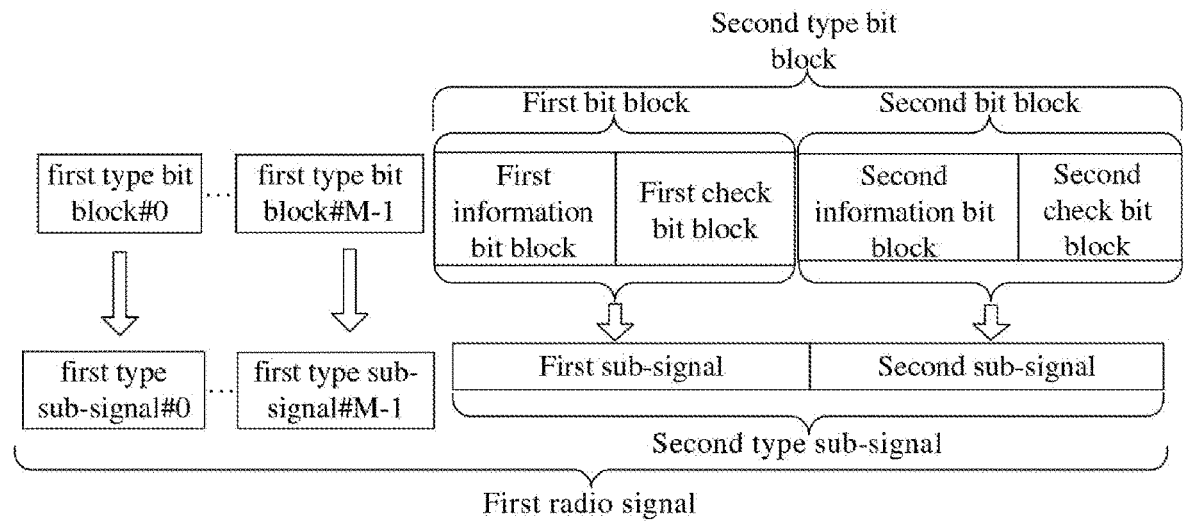
FIG. 5 illustrates a schematic diagram of a method of calculation of the number of REs occupied by M first type sub-signal(s) in time-frequency domain according to another embodiment of the present disclosure.

Embodiment 5 illustrates a schematic diagram of a method of calculation of the number of REs occupied by M first type sub-signal(s) in time-frequency domain, as shown in FIG. 5.

In Embodiment 5, the first radio signal in the present disclosure comprises M first type sub-signal(s) and a second type sub-signal, the M first type sub-signal(s) carries(carry) M first type bit block(s) respectively, the second type sub-signal carries a second type bit block. The second type bit block comprises a first bit block and a second bit block, the first bit block comprises a first information bit block and a first check bit block, the second bit block comprises a second information bit block and a second check bit block. The first check bit block is a CRC bit block of the first information bit block, the second check bit block is a CRC bit block of the second information bit block. The second type sub-signal comprises a first sub-signal and a second sub-signal, the first sub-signal carries the first bit block, the second sub-signal carries the second bit block. M first type value(s) is(are) respectively used to determine a number (numbers) of REs occupied by the M first type sub-signal(s) in time-frequency domain. The M first type value(s) corresponds(correspond) to M reference value(s) respectively, the first signaling in the present disclosure is used to determine a ratio of each first type value of the M first type value(s) to a corresponding reference value. The number of REs occupied by the first radio signal in time-frequency domain is used to determine the M reference value(s). The M first type value(s) corresponds(correspond) to M first offset(s) respectively, any first type value of the M first type value(s) is linearly correlated to a corresponding first offset. The M first type sub-signal(s) corresponds(correspond) to M first limit value(s) respectively.

M1 reference value(s) of the M reference value(s) is(are) respectively equal to a reciprocal of a sum of a number of bits in the first bit block divided by a number of REs occupied by the first sub-signal in time-frequency domain and a number of bits in the second bit block divided by a number of REs occupied by the second sub-signal in time-frequency domain. Reference value(s) of the M reference value(s) not belonging to the M1 reference value(s) is(are) respectively equal to a ratio of a number of REs occupied by a first target sub-signal in time-frequency domain to a number of bits in a first target bit block. The first target sub-signal is one of the first sub-signal and the second sub-signal, the first target bit block is one of the first bit block and the second bit block, the first target sub-signal carries the first target bit block. The M1 is a non-negative integer less than or equal to the M.

In FIG. 5, indices for the M first type sub-signal(s), the M first type bit block(s), the M first type value(s), the M reference value(s), the M first offset(s) and the M first limit value(s) are #0, #1, #2 . . . and #M−1, respectively. A first type sub-signal #i carries a first type bit block #i, a first type value #i is used to determine a number of REs occupied by a first type sub-signal #i in time-frequency domain, a first type value #i corresponds to a reference value #i, a first type value #i corresponds to a first offset #i, a first type sub-signal #i corresponds to a first type limit value #i. The i is a non-negative integer less than M.

In one embodiment, the first radio signal is an initial transmission of the second type bit block.

In one embodiment, the first target sub-signal is one of the first sub-signal and the second sub-signal that corresponds to a maximum IMCS, the IMCS indicates MCS of a corresponding radio signal. The specific meaning of the IMCS can be found in TS36.213 and TS36.212.

In one embodiment, the M1 is equal to 0.

In one embodiment, the M1 is equal to the M.

In one embodiment, the M1 is less than the M.

In one embodiment, the second check bit block is not related to the first information bit block, the first check bit block is not related to the second information bit block.

In one embodiment, the M1 reference value(s) corresponds(correspond) to M1 first type sub-signal(s) respectively, the M1 first type sub-signal(s) is(are) a subset of the M first type sub-signal(s). A number of REs occupied by any first type sub-signal of the M1 first type sub-signal(s) in time-frequency domain is equal to a maximum value between a second limit value and a minimum value between a corresponding first limit value and a product of a corresponding first type value and a number of bits comprised in a corresponding first type bit block. The corresponding first limit value is equal to the number of subcarriers occupied by the first radio signal in frequency domain multiplied by 4, the second limit value is equal to $Q'_{min}$, the $Q'_{min}$ is determined by modulation order of the second type sub-signal and the number of bits in the corresponding first type bit block. The specific meaning of the $Q'_{min}$ can be found in TS36.212.

In one subembodiment of the above embodiment, any first type sub-signal of the M1 first type sub-signal(s) carries at least one of HARQ-ACK, an RI or a CRI.

In one embodiment, a number of REs occupied by any first type sub-signal of the M first type sub-signal(s) not belonging to the M1 first type sub-signal(s) in time-frequency domain is equal to a minimum value between a corresponding first limit value and a product of a corresponding first type value and a number of bits comprised in a corresponding first type bit block. The corresponding first limit value is equal to the number of REs occupied by the first radio signal in time-frequency domain minus a ratio of $Q_{RI}^{(x)}$ to $Q_m^{(x)}$. The $Q_{RI}^{(x)}$ is related to a number of bits in RI(s) or CRI(s) carried by the M first type sub-signal(s), the $Q_m^{(x)}$ is related to modulation order of the second type sub-signal. The specific meaning of the $Q_{RI}^{(x)}$ and the $Q_m^{(x)}$ can be found in TS36.212.

In one subembodiment of the above embodiment, any first type sub-signal of the M first type sub-signal(s) not belonging to the M1 first type sub-signal(s) carries at least one of a CQI or a PMI.

In one embodiment, a first type value of the M first type value(s) is equal to a product of a corresponding first offset and a corresponding reference value. A first type sub-signal #i is any first type sub-signal of the M1 first type sub-signal(s), the number of REs occupied by the first type sub-signal #i in time-frequency domain is equal to:

$$Q' = \max\left[\min\left(\frac{O \cdot M_{sc}^{PUSCH-initial(1)} \cdot N_{symb}^{PUSCH-initial(1)} \cdot M_{sc}^{PUSCH-initial(2)} \cdot N_{symb}^{PUSCH-initial(2)} \cdot \beta_1}{\sum_{r=0}^{C^{(1)}-1} K_r^{(1)} \cdot M_{sc}^{PUSCH-initial(2)} \cdot N_{symb}^{PUSCH-initial(2)} + \sum_{r=0}^{C^{(2)}-1} K_r^{(2)} \cdot M_{sc}^{PUSCH-initial(1)} \cdot N_{symb}^{PUSCH-initial(1)}}, 4 \cdot M_{sc}^{PUSCH}\right), Q'\min\right]$$

Herein, $M_{sc}^{PUSCH-initial(1)} \cdot N_{symb}^{PUSCH-initial(1)}$ and $M_{sc}^{PUSCH-initial(2)} \cdot N_{symb}^{PUSCH-initial(2)}$ respectively refer to the number of REs occupied by the first sub-signal in time-frequency domain, and the number of REs occupied by the second sub-signal in time-frequency domain. The $M_{sc}^{PUSCH-initial(1)}$, the $N_{symb}^{PUSCH-initial(1)}$, the $M_{sc}^{PUSCH-initial(2)}$ and the $N_{symb}^{PUSCH-initial(2)}$ respectively refer to a number of subcarriers occupied by the first sub-signal in frequency domain, a number of broadband symbols occupied by the first sub-signal in time domain, a number of subcarriers occupied by the second sub-signal in frequency domain and a number of broadband symbols occupied by the second sub-signal in time domain. The specific meaning of the Q', the O, the $M_{sc}^{PUSCH-initial(1)}$, the $N_{sc}^{PUSCH-initial(1)}$, the $M_{sc}^{PUSCH-initial(2)}$, the $N_{symb}^{PUSCH-initial(2)}$, the C(1), the $K_r^{(1)}$, the C(2), the $K_r^{(2)}$, the $M_{sc}^{PUSCH}$ and the $Q'_{min}$ can be found in TS36.213 and TS36.212.

In one embodiment, the M first type value(s) is(are) linearly correlated to a second offset respectively. A first type value of the M first type value(s) is equal to a product of a corresponding reference value and a corresponding first offset further multiplied by the second offset. A first type sub-signal #i is any first type sub-signal of the M first type sub-signal(s) not belonging to the M1 first type sub-signal(s), the number of REs occupied by the first type sub-signal #i in time-frequency domain is equal to:

$$Q' = \min\left(\left\lceil\frac{(O+L) \cdot M_{sc}^{PUSCH-initial(x)} \cdot N_{symb}^{PUSCH-initial(x)} \cdot \beta_1 \cdot \beta_2}{\sum_{r=0}^{C^{(x)}-1} K_r^{(x)}}\right\rceil, M_{sc}^{PUSCH} \cdot N_{symb}^{PUSCH} - \frac{Q_{RI}^{(x)}}{Q_m^{(x)}}\right)$$

Herein, $$M_{sc}^{PUSCH-initial(x)} \cdot N_{symb}^{PUSCH-initial(x)} \text{ and } \sum_{r=0}^{C^{(x)}-1} K_r^{(x)}$$

respectively refer to a number of REs occupied by the first target sub-signal in time-frequency domain and a number of bits in the first target bit block. The $M_{sc}^{PUSCH-initial(x)}$, the $N_{symb}^{PUSCH-initial(x)}$, the C(x) and the $K_r^{(x)}$ respectively refer to a number of subcarriers occupied by the first target sub-signal in frequency domain, a number of broadband symbols occupied by the first target sub-signal in time domain, a number of code blocks comprised in the first target bit block, and a number of bits in the r-th code block in the first target bit block. The specific meaning of the O, the L, the $M_{sc}^{PUSCH-initial(x)}$, the $N_{symb}^{PUSCH-initial(x)}$, the C(x), the $K_r^{(x)}$, the $M_{sc}^{PUSCH}$, the $N_{symb}^{PUSCH}$, the $Q_{RI}^{(x)}$ and the $Q_m^{(x)}$ can be found in TS36.213 and TS36.212.

In one embodiment, the M first type value(s) is(are) linearly correlated to a second offset respectively. A first type value of the M first type value(s) is equal to a corresponding reference value multiplied by a sum of a corresponding first offset and the second offset. A first type sub-signal #i is any first type sub-signal of the M1 first type sub-signal(s), the number of REs occupied by the first type sub-signal #i in time-frequency domain is equal to:

$$Q' = \max\left[\min\left[\begin{pmatrix} O \cdot M_{sc}^{PUSCH-initial(1)} \cdot N_{symb}^{PUSCH-initial(1)} \cdot \\ \dfrac{M_{sc}^{PUSCH-initial(2)} \cdot N_{symb}^{PUSCH-initial(2)} \cdot (\beta_1 + \beta_2)}{\sum_{r=0}^{C^{(1)}-1} K_r^{(1)} \cdot M_{sc}^{PUSCH-initial(2)} \cdot N_{symb}^{PUSCH-initial(2)} +} \\ \sum_{r=0}^{C^{(2)}-1} K_r^{(2)} \cdot M_{sc}^{PUSCH-initial(1)} \cdot N_{symb}^{PUSCH-initial(1)} \end{pmatrix}, 4 \cdot M_{sc}^{PUSCH}\right], Q'\min\right]$$

Herein, $$\dfrac{M_{sc}^{PUSCH-initial(1)} \cdot N_{symb}^{PUSCH-initial(1)} \cdot}{\sum_{r=0}^{C^{(1)}-1} K_r^{(1)} \cdot M_{sc}^{PUSCH-initial(2)} \cdot N_{symb}^{PUSCH-initial(2)} +} M_{sc}^{PUSCH-initial(2)} \cdot N_{symb}^{PUSCH-initial(2)} \cdot (\beta_1 + \beta_2)$$

$$\sum_{r=0}^{C^{(2)}-1} K_r^{(2)} \cdot M_{sc}^{PUSCH-initial(1)} \cdot N_{symb}^{PUSCH-initial(1)}$$

refers to the first type value #i.

Embodiment 6

Figure 6:
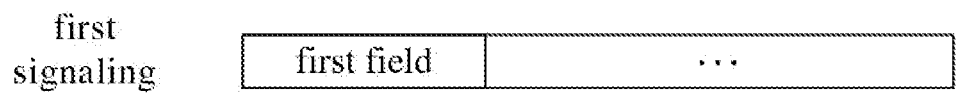
FIG. 6 illustrates a schematic diagram of a part of a first signaling used to indicate a ratio of a first type value to a corresponding reference value according to one embodiment of the present disclosure.

Embodiment 6 illustrates a schematic diagram of a part of a first signaling used to indicate a ratio of a first type value to a corresponding reference value, as shown in FIG. 6.

In Embodiment 6, the first signaling comprises a first field. The first field of the first signaling explicitly indicates a ratio of each first type value of the M first type value(s) to a corresponding reference value.

In one embodiment, the first field comprises 1 bit.
In one embodiment, the first field comprises 2 bits.
In one embodiment, the first field comprises 3 bits.
In one embodiment, the first field comprises 4 bits.

In one embodiment, the first field of the first signaling explicitly indicates M first offset(s), the M first type value(s) corresponds(correspond) to the M first offset(s) respectively, any first type value of the M first type value(s) is linearly correlated to a corresponding offset.

In one subembodiment of the above embodiment, any first type value of the M first type value(s) is equal to a product of a corresponding first offset and a corresponding reference value.

In one embodiment, the M first offset(s) belongs(belong) to M offset set(s) respectively, any offset set of the M offset set(s) comprises a positive integer number of offset(s).

In one subembodiment of the above embodiment, the first field of the first signaling explicitly indicates an index of each first offset of the M first offset(s) in a corresponding offset set.

In one subembodiment of the above embodiment, the first field of the first signaling explicitly indicates a reference index, an index of any first offset of the M first offset(s) in a corresponding offset set is the reference index.

In one subembodiment of the above embodiment, the first downlink signaling in the present disclosure indicates the M offset set(s).

In one embodiment, the first field of the first signaling indicates a second offset, the M first type value(s) is(are) linearly correlated to the second offset respectively.

In one subembodiment of the above embodiment, each first type value of the M first type value(s) is equal to a product of a corresponding reference value and a corresponding first offset further multiplied by the second offset.

In one subembodiment of the above embodiment, each first type value of the M first type value(s) is equal to a corresponding reference value multiplied by a sum of a corresponding first offset and the second offset.

In one subembodiment of the above embodiment, the second downlink signaling in the present disclosure indicates the M first offset(s).

In one subembodiment of the above embodiment, the second offset belongs to an offset group, the offset group comprises a positive integer number of offset(s), the first field of the first signaling explicitly indicates an index of the second offset in the offset group.

In a reference embodiment of the above subembodiment, the second downlink signaling indicates the offset group.

Embodiment 7

Figure 7:
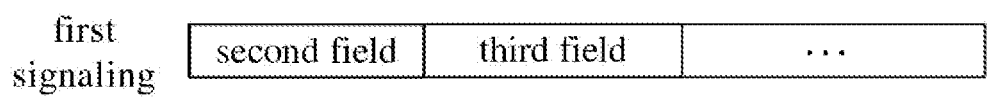
FIG. 7 illustrates a schematic diagram of a part of a first signaling used to indicate a ratio of a first type value to a corresponding reference value according to another embodiment of the present disclosure.

Embodiment 7 illustrates a schematic diagram of a part of a first signaling used to indicate a ratio of a first type value to a corresponding reference value, as shown in FIG. 7.

In Embodiment 7, the first signaling comprises a second field and a third field. At least one of a second field and a third field of the first signaling implicitly indicates a ratio of each first type value of the M first type value(s) to a corresponding reference value. The second field of the first signaling indicates at least the former of MCS and an RV of the second type sub-signal in the present disclosure, the third field of the first signaling indicates a time-frequency resource occupied by the first radio signal in the present disclosure.

In one embodiment, the second field of the first signaling implicitly indicates M first offset(s), the M first type value(s) corresponds(correspond) to the M first offset(s) respectively, any first type value of the M first type value(s) is linearly correlated to a corresponding first offset.

In one subembodiment 2 of the Embodiment 7, the M first offset(s) belongs(belong) to M offset set(s) respectively, an index of any first offset of the M first offset(s) in a corresponding offset set is related to at least the former of MCS and an RV of the second type sub-signal.

In one subembodiment of the above embodiment, an index of any first offset of the M first offset(s) in a corresponding offset set is equal to a reference index, the reference index is related to at least the former of MCS and an RV of the second type sub-signal.

In one subembodiment of the above embodiment, the first downlink signaling in the present disclosure indicates the M offset set(s).

In one embodiment, the third field of the first signaling implicitly indicates the M first offset(s).

In one embodiment, the M first offset(s) belongs(belong) to M offset set(s) respectively, an index of any first offset of the M first offset(s) in a corresponding offset set is related to a time-frequency resource occupied by the first radio signal.

In one subembodiment of the above embodiment, an index of any first offset of the M first offset(s) in a corresponding offset set is equal to a reference index, the reference index is related to a time-frequency resource occupied by the first radio signal.

In one embodiment, a second field and a third field of the first signaling implicitly indicates the M first offset(s).

In one embodiment, the M first offset(s) belongs(belong) to M offset set(s) respectively, an index of any first offset of the M first offset(s) in a corresponding offset set is related to at least the former two of a time-frequency resource occupied by the first radio signal, MCS of the second type sub-signal and an RV of the second type sub-signal.

In one subembodiment of the above embodiment, an index of any first offset of the M first offset(s) in a corresponding offset set is equal to a reference index, the reference index is related to at least the former two of a time-frequency resource occupied by the first radio signal, MCS of the second type sub-signal and an RV of the second type sub-signal.

In one embodiment, a second field of the first signaling implicitly indicates a second offset, the M first type value(s) is(are) linearly correlated to the second offset respectively.

In one subembodiment of the above embodiment, the second downlink signaling in the present disclosure indicates the M first offset(s).

In one subembodiment of the above embodiment, the second offset belongs to an offset group, an index of the second offset in the offset group is related to at least the former of MCS and an RV of the second type sub-signal.

In a reference embodiment of the above subembodiment, the second downlink signaling indicates the offset group.

In one embodiment, a third field of the first signaling implicitly indicates the second offset.

In one subembodiment of the above embodiment, the second offset belongs to an offset group, an index of the second offset in the offset group is related to a time-frequency resource occupied by the first radio signal.

In one embodiment, a second field and a third field of the first signaling implicitly indicates the second offset.

In one subembodiment of the above embodiment, the second offset belongs to an offset group, an index of the second offset in the offset group is related to at least the former two of a time-frequency resource occupied by the first radio signal, MCS of the second type sub-signal and an RV of the second type sub-signal.

Embodiment 8

Figure 8:
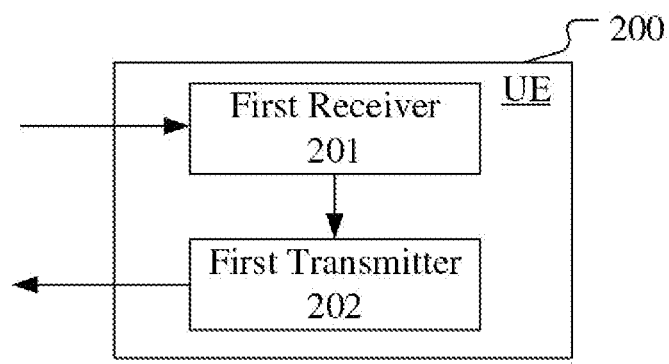
FIG. 8 illustrates a structure block diagram of a processing device in a UE according to one embodiment of the present disclosure.

Embodiment 8 illustrates a structure block diagram of a processing device in a UE, as shown in FIG. 8.

In FIG. 8, a UE device 200 mainly consists of a first receiver 201 and a first transmitter 202.

In Embodiment 8, a first receiver 201 receives a first signaling; a first transmitter 202 transmits a first radio signal.

In Embodiment 8, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block. M first type value(s) is(are) respectively used by the first transmitter 202 to determine a number of REs occupied by the M first type sub-signal(s) in time-frequency domain. The M first type value(s) corresponds(correspond) to M reference value(s) respectively, the first signaling is used by the first transmitter 202 to determine a ratio of each first type value of the M first type value(s) to a corresponding reference value. The M is a positive integer.

In one embodiment, the number of REs occupied by the first radio signal in time-frequency domain is used by the first transmitter 202 to determine the M reference value(s).

In one embodiment, the number of REs occupied by a second radio signal in time-frequency domain is used by the first transmitter 202 to determine the M reference value(s). The second radio signal carries the second type bit block. The second radio signal is an initial transmission of the second type bit block, the first radio signal is a retransmission of the second type bit block.

In one embodiment, the first receiver 201 further receives a second signaling, the first transmitter 202 further transmits the second radio signal. Herein, the second signaling comprises scheduling information of the second radio signal.

In one embodiment, the first signaling is used by the first transmitter 202 to determine M first offset(s), the M first type value(s) corresponds(correspond) to the first offset(s) respectively, any first type value of the M first type value(s) is linearly correlated to a corresponding first offset.

In one embodiment, the first signaling is used by the first transmitter 202 to determine a second offset, the M first type value(s) is(are) linearly correlated to the second offset respectively.

In one embodiment, the first receiver 201 further receives a first downlink signaling. Herein, the first downlink signaling is used by the first transmitter 202 to determine M offset set(s), any offset set of the M offset set(s) comprises a positive integer number of offset(s), the M first offset(s) belongs(belong) to the M offset set(s) respectively.

In one embodiment, the first receiver 201 further receives a second downlink signaling. Herein, the second downlink signaling is used by the first transmitter 202 to determine M first offset(s), the M first type value(s) corresponds(correspond) to the M first offset(s) respectively, any first type value of the M first type value(s) is linearly correlated to a corresponding first offset.

In one embodiment, an index of each first offset of the M first offset(s) in a corresponding offset set is related to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

Embodiment 9

Figure 9:
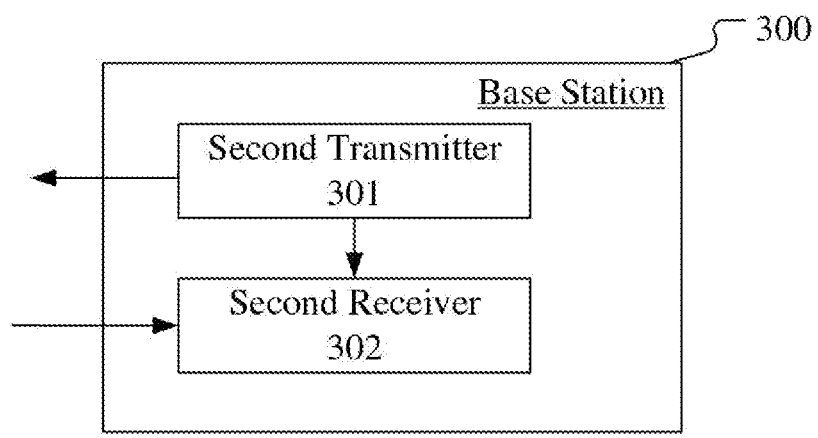
FIG. 9 illustrates a structure block diagram of a processing device in a base station according to one embodiment of the present disclosure.

Embodiment 9 illustrates a structure block diagram of a processing device in a base station, as shown in FIG. 9. In FIG. 9, a base station device 300 mainly consists of a second transmitter 301 and a second receiver 302.

In Embodiment 9, a second transmitter 301 transmits a first signaling; a second receiver 302 receives a first radio signal.

In Embodiment 9, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block. M first type value(s) is(are) respectively used to determine a number(numbers) of REs occupied by the M first type sub-signal(s) in time-frequency domain. The M first type value(s) corresponds (correspond) to M reference value(s) respectively, the first signaling is used to determine a ratio of each first type value of the M first type value(s) to a corresponding reference value. The M is a positive integer.

In one embodiment, the number of REs occupied by the first radio signal in time-frequency domain is used to determine the M reference value(s).

In one embodiment, the number of REs occupied by a second radio signal in time-frequency domain is used to determine the M reference value(s). The second radio signal carries the second type bit block. The second radio signal is an initial transmission of the second type bit block, the first radio signal is a retransmission of the second type bit block.

In one embodiment, the second transmitter 301 further transmits a second signaling, the second receiver 302 further receives the second radio signal. Herein, the second signaling comprises scheduling information of the second radio signal.

In one embodiment, the first signaling is used to determine M first offset(s), the M first type value(s) corresponds (correspond) to the M first offset(s) respectively, any first type value of the M first type value(s) is linearly correlated to a corresponding first offset.

In one embodiment, the first signaling is used to determine a second offset, the M first type value(s) is(are) linearly correlated to the second offset respectively.

In one embodiment, the second transmitter 301 further transmits a first downlink signaling. Herein, the first downlink signaling is used to determine M offset set(s), any offset set of the M offset set(s) comprises a positive integer number of offset(s), the M first offset(s) belongs(belong) to the M offset set(s) respectively.

In one embodiment, the second transmitter 301 further transmits a second downlink signaling. Herein, the second downlink signaling is used to determine M first offset(s), the M first type value(s) corresponds(correspond) to the M first offset(s) respectively, any first type value of the M first type value(s) is linearly correlated to a corresponding first offset.

In one embodiment, an index of each first offset of the M first offset(s) in a corresponding offset set is related to a first parameter, the first parameter includes at least one of a user case for the second type bit block, a number of transmissions, MCS of the second type sub-signal, an RV of the second type sub-signal, or a time-frequency resource occupied by the first radio signal, the number of transmissions is a number of transmissions of the second type bit block as of the first radio signal.

Embodiment 10

Figure 10:
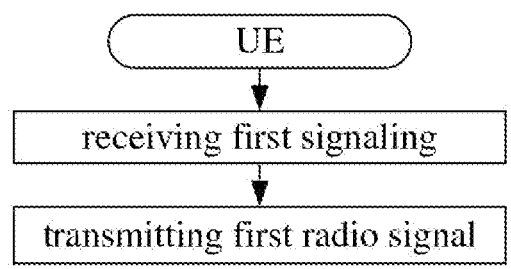
FIG. 10 illustrates a flowchart of a first signaling and a first radio signal according to one embodiment of the present disclosure.

Embodiment 10 illustrates a flowchart of a first signaling and a first radio signal, as shown in FIG. 10.

In Embodiment 10, the UE in the present disclosure receives a first signaling, and transmits a first radio signal. Herein, the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds (correspond) to M reference value(s) respectively, the first signaling is used to determine a ratio of each first type value of the M first type value(s) to a corresponding reference value; the M is a positive integer.

In one embodiment, the Resource Elements (REs) occupy duration time of a broadband symbol in time domain, and occupy a subcarrier bandwidth in frequency domain.

In one subembodiment of the above embodiment, the broadband symbol is an OFDM symbol.

In one subembodiment of the above embodiment, the broadband symbol is a DFT-S-OFDM symbol.

In one subembodiment of the above embodiment, the broadband symbol is an FBMC symbol.

In one embodiment, the M reference value(s) is(are) determined by the number of REs occupied by the first radio signal in time-frequency domain and the number of bits comprised in the second type bit block.

In one embodiment, the M reference value(s) is(are) determined by the number of REs occupied by a second radio signal in time-frequency domain and the number of bits comprised in the second type bit block, the second radio signal carries the second type bit block. The second radio signal is an initial transmission of the second type bit block, the first radio signal is a retransmission of the second type bit block.

In one embodiment, REs occupied by any first type sub-signal of the M first type sub-signal(s) in time-frequency domain and those occupied by the second type sub-signal in time-frequency domain are non-overlapping.

In one embodiment, REs occupied by any two different first type sub-signals of the M first type sub-signals in time-frequency domain are non-overlapping.

In one embodiment, the first signaling is a physical layer signaling.

In one embodiment, the first signaling is a dynamic signaling.

In one embodiment, the first signaling is a dynamic signaling used for uplink grant.

In one embodiment, the first signaling is transmitted on a downlink physical layer control channel (i.e., a downlink channel that can only be used for bearing a physical layer signaling).

In one embodiment, the scheduling information includes at least one of a time domain resource occupied, a frequency domain resource occupied, an MCS, a HARQ process number, an RV or an NDI.

In one embodiment, the first radio signal comprises uplink data and UCI.

In one embodiment, the first radio signal is transmitted on an uplink physical layer data channel (i.e., an uplink channel that can be used for bearing physical layer data).

In one embodiment, the M first type bit block(s) comprises(comprise) UCI respectively.

In one subembodiment of the above embodiment, the UCI includes at least one of HARQ-ACK, CSI, an RI, a CQI, a PMI, or a CRI.

In one embodiment, the second type bit block comprises uplink data.

In one embodiment, the M first type sub-signal(s) corresponds(correspond) to M first limit value(s) respectively. For any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

In one subembodiment of the above embodiment, a first limit value corresponding to the given first type sub-signal is equal to a number of subcarriers occupied by the first radio signal in frequency domain multiplied by 4, the given first type sub-signal carries at least one of HARQ-ACK, an RI, or a CRI.

In one subembodiment of the above embodiment, a first limit value corresponding to the given first type sub-signal is equal to the number of REs occupied by the first radio signal in time-frequency domain minus a ratio of $Q_{RI}^{(x)}$ to $Q_m^{(x)}$, the given first type sub-signal carries at least one of a CQI or a PMI. The $Q_{RI}^{(x)}$ is related to a number of bits in RI(s) or CRI(s) carried by the M first type sub-signal(s), the $Q_m^{(x)}$ is related to modulation order of the second type sub-signal. The specific meaning of the $Q_{RI}^{(x)}$ and the $Q_m^{(x)}$ can be found in TS36.212.

In one embodiment, the M first type sub-signal(s) corresponds(correspond) to M first limit value(s) respectively. For any given first type sub-signal of the M first type sub-signal(s), the number of REs occupied by the given first type sub-signal in time-frequency domain is equal to a maximum value between a second limit value and a minimum value between a corresponding first limit value and a product of a corresponding first type value and a number of bits comprised in a corresponding first type bit block.

In one subembodiment of the above embodiment, a first limit value corresponding to the given first type sub-signal is equal to a number of subcarriers occupied by the first radio signal in frequency domain multiplied by 4.

In one subembodiment of the above embodiment, the second limit value is equal to $Q'_{min}$, the $Q'_{min}$ is determined by modulation order of the second type sub-signal and a number of bits in a first type bit block corresponding to the given first type sub-signal. The specific meaning of the $Q'_{min}$ can be found in TS36.212.

In one subembodiment of the above embodiment, the given first type sub-signal carries at least one of HARQ-ACK, an RI, or a CRI.

In one embodiment, a given radio signal carrying a given bit block refers to: the given radio signal is an output after the given bit block is sequentially subjected to Channel Coding, a Modulation Mapper, a Layer Mapper, Precoding, a Resource Element Mapper, and Broadband Symbol Generation.

In one embodiment, a given radio signal carrying a given bit block refers to: the given radio signal is an output after the given bit block is sequentially subjected to Channel Coding, a Modulation Mapper, a Layer Mapper, a transform precoder, Precoding, a Resource Element Mapper, and Broadband Symbol Generation.

In one embodiment, a given radio signal carrying a given bit block refers to: the given bit block is used to generate the given radio signal.

Embodiment 11

Figure 11:
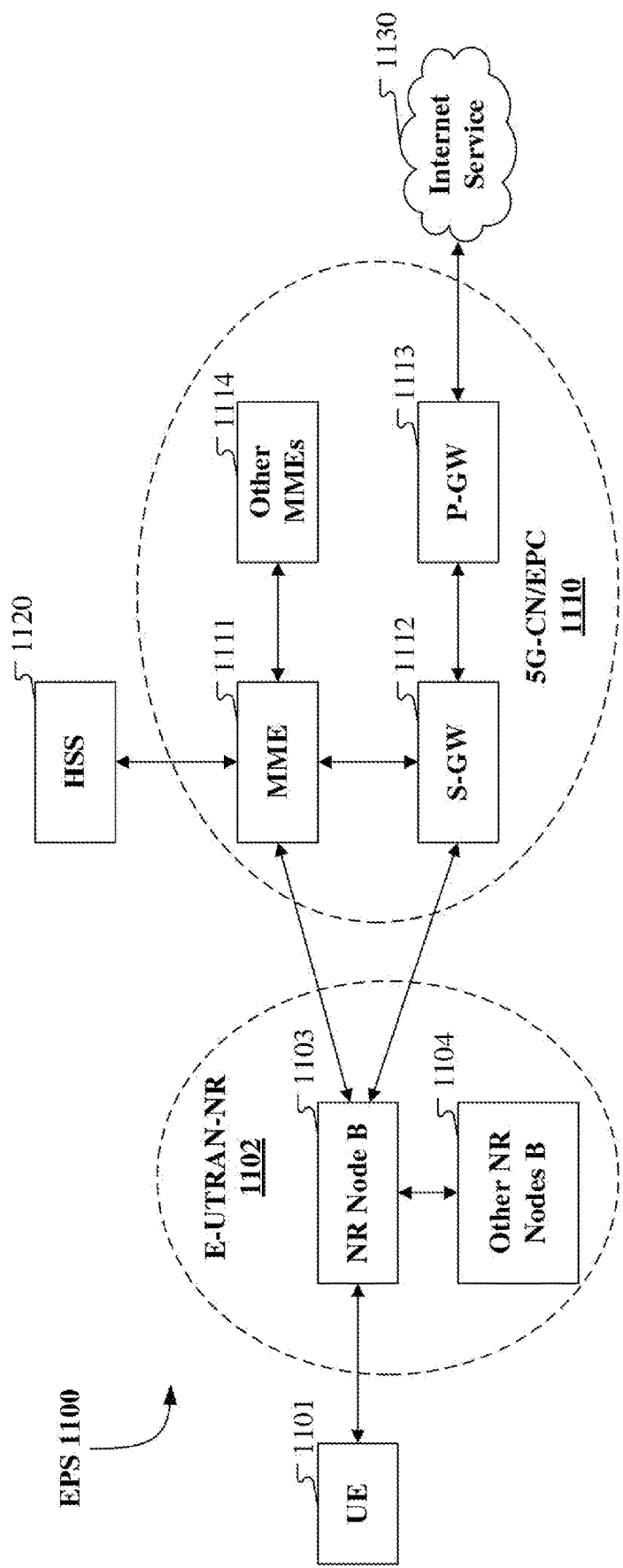
FIG. 11 illustrates a schematic diagram of a network architecture according to one embodiment of the present disclosure.

Embodiment 11 illustrates a schematic diagram of a network architecture, as shown in FIG. 11.

FIG. 11 is a diagram illustrating a network architecture 1100 of Long-Term Evolution (LTE), Long-Term Evolution Advanced (LTE-A) and future 5G systems. The LTE network architecture 1100 may be called an Evolved Packet System (EPS) 1100. The EPS 1100 may comprise one or more UEs 1101, an E-UTRAN-NR 1102, a 5G-Core Network/Evolved Packet Core (EPC/5G-CN) 1110, a Home Subscriber Server (HSS) 1120 and an Internet Service 1130. Herein, UMTS refers to Universal Mobile Telecommunications System. The EPS 1100 may be interconnected with other access networks. For simple description, the entities/interfaces are not shown. As shown in FIG. 11, the EPS 1100 provides packet switching services. Those skilled in the art will find it easy to understand that various concepts presented throughout the present disclosure can be extended to networks providing circuit switching services. The E-UTRAN-NR 1102 comprises an NR node B (gNB) 1103 and other gNBs 1104. The gNB 1103 provides UE 1101 oriented user plane and control plane protocol terminations. The gNB 1103 may be connected to other gNBs 1104 via an X2 interface (for example, backhaul). The gNB 1103 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 1103 provides an access point of the 5G-CN/EPC 1110 for the UE 1101. Examples of UE 1101 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 1101 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 1103 is connected to the 5G-CN/EPC 1110 via an S1 interface. The 5G-CN/EPC 1110 comprises an MME 1111, other MMEs 1114, a Service Gateway (S-GW) 1112 and a Packet Date Network Gateway (P-GW) 1113. The MME 1111 is a control node for processing a signaling between the UE 1101 and the 5G-CN/EPC 1110. Generally, the MME 1111 provides bearer and connection management. All user Internet Protocol (IP) packets are transmitted through the S-GW 1112, the S-GW 1112 is connected to the P-GW 1113. The P-GW 1113 provides UE IP address allocation and other functions. The P-GW 1113 is connected to the Internet Service 1130. The Internet Service 230 comprises IP services corresponding to operators, specifically including Internet, Intranet, IP Multimedia Subsystem (IMS) and Packet Switching Streaming Services (PSSs).

In one subembodiment, the UE 1101 corresponds to the UE in the present disclosure.

In one subembodiment, the gNB 1103 corresponds to the base station in the present disclosure.

Embodiment 12

Figure 12:
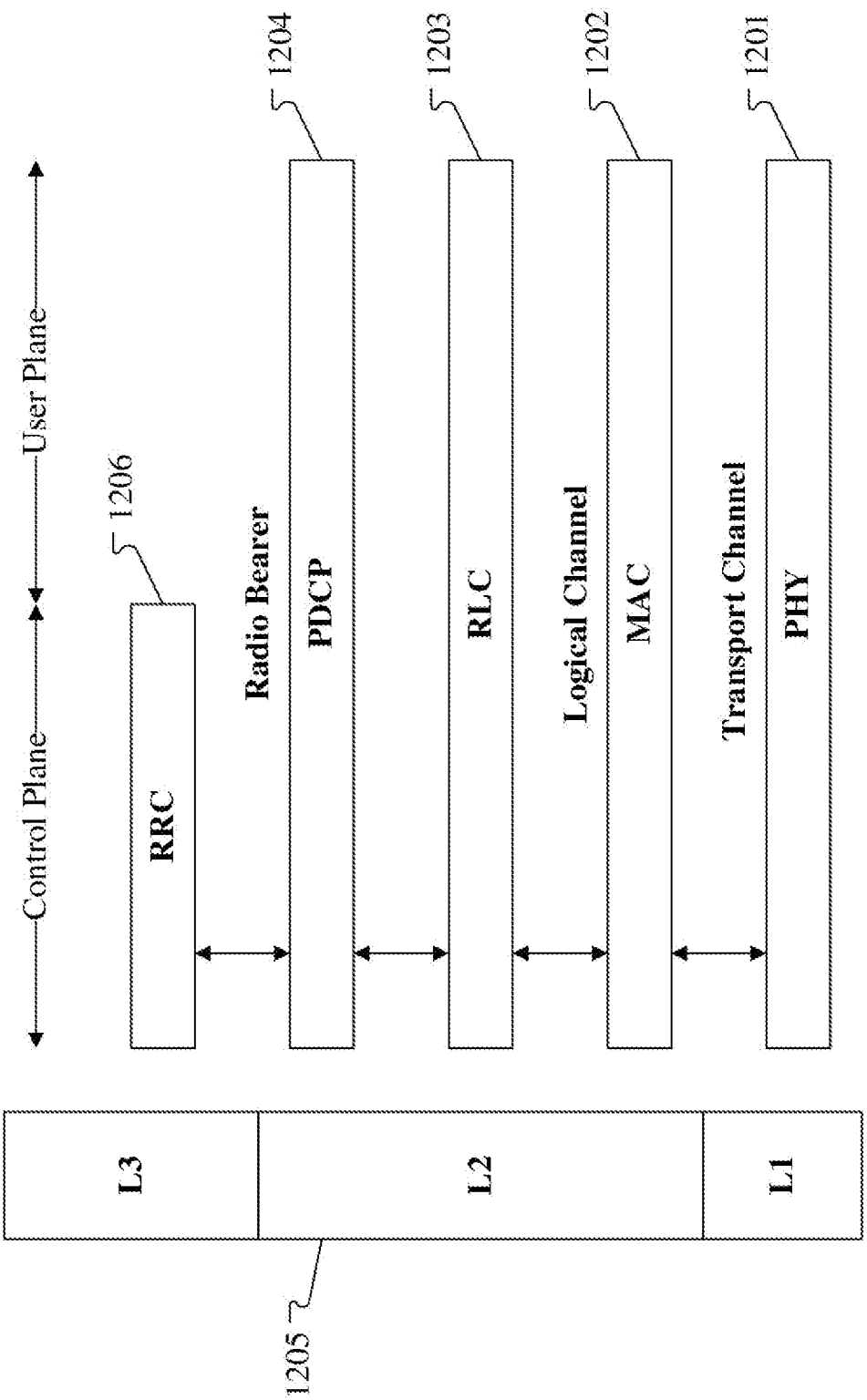
FIG. 12 illustrates a schematic diagram of an embodiment of a radio protocol architecture of a user plane and a control plane according to one embodiment of the present disclosure.

Embodiment 12 illustrates a schematic diagram of an embodiment of a radio protocol architecture of a user plane and a control plane, as shown in FIG. 12.

FIG. 12 is a schematic diagram illustrating a radio protocol architecture of a user plane and a control plane. In FIG. 12, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 1201 in the present disclosure. The layer 2 (L2) 1205 is above the PHY 1201, and is in charge of the link between the UE and the gNB via the PHY 1201. In the user plane, L2 1205 comprises a Medium Access Control (MAC) sublayer 1202, a Radio Link Control (RLC) sublayer 1203 and a Packet Data Convergence Protocol (PDCP) sublayer 1204. All the three sublayers terminate at the gNBs of the network side. Although not described in FIG. 12, the UE may comprise several protocol layers above the L2 1205, such as a network layer (i.e., IP layer) terminated at a P-GW 1113 of the network side and an application layer terminated at the other side of the connection (i.e., a peer UE, a server, etc.). The PDCP sublayer 1204 provides multiplexing among variable radio bearers and logical channels. The PDCP sublayer 1204 also provides a header compression for a higher-layer packet so as to reduce a radio transmission overhead. The PDCP sublayer 1204 provides security by encrypting a packet and provides support for UE handover between gNBs. The RLC sublayer 1203 provides segmentation and reassembling of a higher-layer packet, retransmission of a lost packet, and reordering of a packet so as to compensate the disordered receiving caused by Hybrid Automatic Repeat reQuest (HARQ). The MAC sublayer 1202 provides multiplexing between a logical channel and a transport channel. The MAC sublayer 1202 is also responsible for allocating between UEs various radio resources (i.e., resource block) in a cell. The MAC sublayer 1202 is also in charge of HARQ operation. In the control plane, the radio protocol architecture of the UE and the gNB is almost the same as the radio protocol architecture in the user plane on the PHY 1201 and the L2 1205, but there is no header compression for the control plane. The control plane also comprises a Radio Resource Control (RRC) sublayer 1206 in the layer 3 (L3). The RRC sublayer 1206 is responsible for acquiring radio resources (i.e., radio bearer) and configuring the lower layer using an RRC signaling between the gNB and the UE.

In one subembodiment, the radio protocol architecture in FIG. 12 is applicable to the UE in the present disclosure.

In one subembodiment, the radio protocol architecture in FIG. 12 is applicable to the base station in the present disclosure.

In one subembodiment, the first signaling in the present disclosure is generated by the PHY 1201.

In one subembodiment, the first radio signal in the present disclosure is generated by the PHY 1201.

In one subembodiment, the M first type bit block(s) in the present disclosure is(are) generated by the PHY 1201.

In one subembodiment, the second type bit block in the present disclosure is generated by the MAC sublayer 1202.

In one subembodiment, the second type bit block in the present disclosure is generated by several protocol layers above the L2 layer 1205.

In one subembodiment, the second signaling in the present disclosure is generated by the PHY 1201.

In one subembodiment, the second radio signal in the present disclosure is generated by the PHY 1201.

In one subembodiment, the first downlink signaling in the present disclosure is generated by the RRC sublayer 1206.

In one subembodiment, the first downlink signaling in the present disclosure is generated by the MAC sublayer 1202.

In one subembodiment, the second downlink signaling in the present disclosure is generated by the RRC sublayer 1206.

In one subembodiment, the second downlink signaling in the present disclosure is generated by the MAC sublayer 1202.

Embodiment 13

Figure 13:
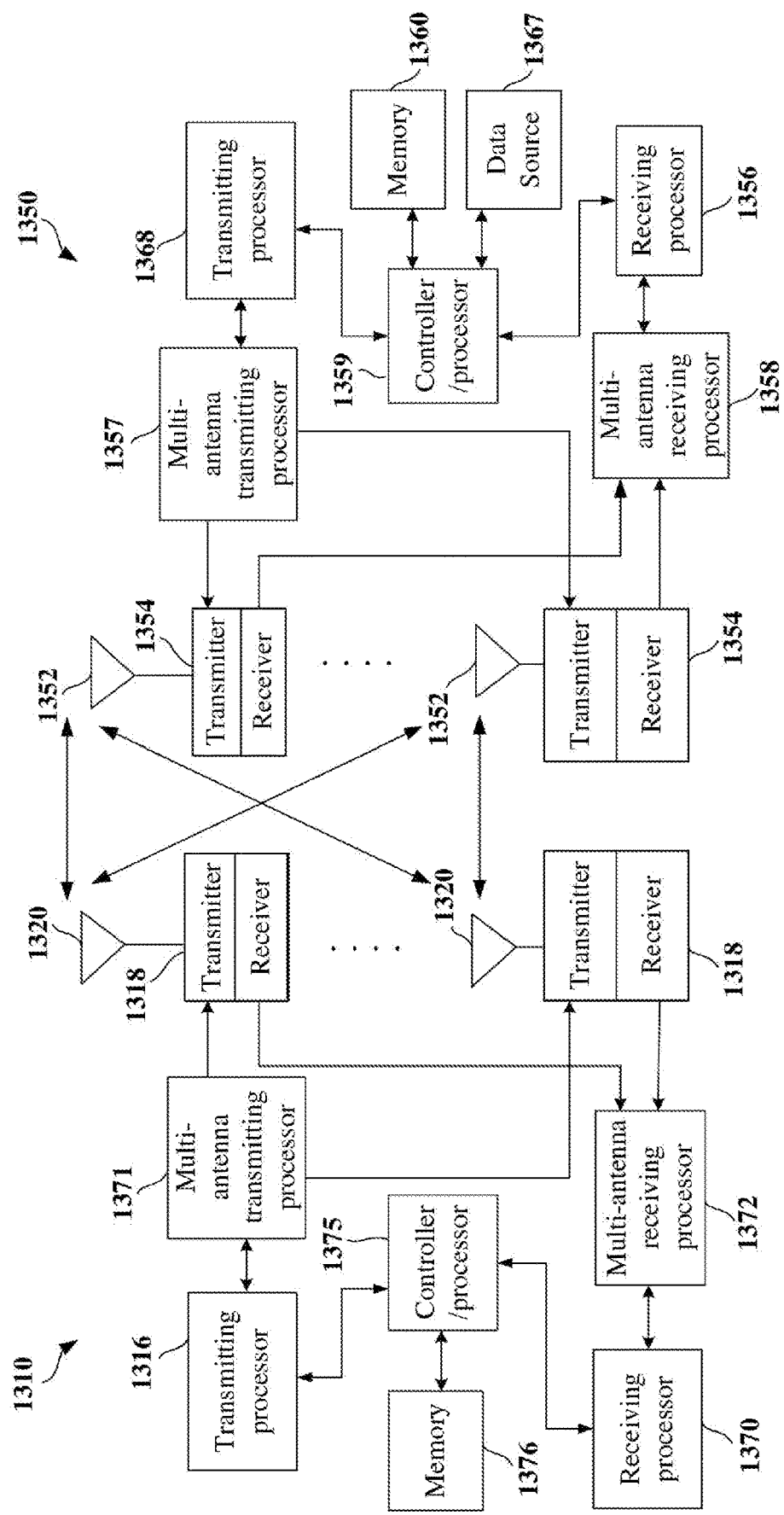
FIG. 13 illustrates a schematic diagram of a New Radio (NR) node and a UE according to one embodiment of the present disclosure.

Embodiment 13 illustrates a schematic diagram of a New Radio (NR) node and a UE, as shown in FIG. 13. FIG. 13 is a block diagram illustrating a UE 1350 and a gNB 1310 that are in communication with each other in access network.

The gNB 1310 comprises a controller/processor 1375, a memory 1376, a receiving processor 1370, a transmitting processor 1316, a multi-antenna receiving processor 1372, a multi-antenna transmitting processor 1371, a transmitter/receiver 1318 and an antenna 1320.

The UE 1350 comprises a controller/processor 1359, a memory 1360, a data source 1367, a transmitting processor 1368, a receiving processor 1356, a multi-antenna transmitting processor 1357, a multi-antenna receiving processor 1358, a transmitter/receiver 1354 and an antenna 1352.

In downlink (DL) transmission, at the gNB 1310, a higher-layer packet from a core network is provided to the controller/processor 1375. The controller/processor 1375 provides a function of the L2 layer. In DL transmission, the controller/processor 1375 provides header compression, encryption, packet segmentation and reordering, and multiplexing between a logical channel and a transport channel, and radio resource allocation for the UE 1350 based on various priorities. The controller/processor 1375 is also in charge of HARQ operation, retransmission of a lost packet, and a signaling to the UE 1350. The transmitting processor 1316 and the multi-antenna transmitting processor perform signal processing functions used for the L1 layer (that is, PHY). The transmitting processor 1316 performs coding and interleaving so as to ensure an FEC (Forward Error Correction) at the UE 1350 side and implements the mapping to signal clusters corresponding to each modulation scheme (i.e., BPSK, QPSK, M-PSK, M-QAM, etc.). The multi-antenna transmitting processor 1371 performs digital spatial precoding/beamforming on encoded and modulated symbols to generate one or more spatial streams. The transmitting processor 1316 then maps each spatial stream into a sub-carrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 1371 performs transmission analog precoding/beamforming operation on the time-domain multi-carrier symbol streams. Each transmitter 1318 converts a baseband multicarrier symbol stream provided by the multi-antenna transmitting processor 1371 into a radio frequency (RF) stream, which is later provided to different antennas 420.

In downlink (DL) transmission, at the UE 1350, each receiver 1354 receives a signal via a corresponding antenna 1352. Each receiver 1354 recovers information modulated to the RF carrier, converts the radio frequency stream into a baseband multicarrier symbol stream to be provided to the receiving processor 1356. The receiving processor 1356 and the multi-antenna receiving processor 1358 perform signal processing functions of the L1 layer. The multi-antenna receiving processor 1358 perform reception analog precoding/beamforming operation on the baseband multicarrier symbol stream provided by the receiver 1354. The receiving processor 1356 converts the baseband multicarrier symbol stream from time domain into frequency domain using FFT. In frequency domain, a physical layer data signal and a reference signal are de-multiplexed by the receiving processor 1356, wherein a reference signal is used for channel estimation, while physical layer data is subjected to multi-antenna detection in the multi-antenna receiving processor 1358 to recover any UE 1350-targeted spatial stream. Symbols on each spatial stream are demodulated and recovered in the receiving processor 1356 to generate a soft decision. Then the channel decoder 1358 decodes and de-interleaves the soft decision to recover the higher-layer data and control signal transmitted on the physical channel by the gNB 1310. Next, the higher-layer data and control signal are provided to the controller/processor 1359. The controller/processor 1359 performs functions of the L2 layer. The controller/processor 1359 can be connected to a memory 1360 that stores program code and data. The memory 1360 can be called a computer readable medium. In downlink transmission, the controller/processor 1359 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 1359 also performs error detection using ACK and/or NACK protocols as a way to support HARQ operation.

In uplink (UL) transmission, at the UE 1350, the data source 1367 is configured to provide a higher-layer packet to the controller/processor 1359. The data source 1367 represents all protocol layers above the L2 layer. Similar to a transmitting function of the gNB 1310 described in DL transmission, the controller/processor 1359 performs header compression, encryption, packet segmentation and reordering, and multiplexing between a logical channel and a transport channel based on radio resource allocation of the gNB 1310 so as to provide the L2 layer functions used for the user plane and the control plane. The controller/processor 1359 is also responsible for HARQ operation, retransmission of a lost packet, and a signaling to the gNB 1310. The transmitting processor 1368 performs modulation mapping and channel coding, and the multi-antenna transmitting processor 1357 performs digital multi-antenna spatial precoding/beamforming. The generated spatial streams are modulated into multicarrier/single-carrier symbol streams by the transmitting processor 1368, and then modulated symbol streams are subjected to analog precoding/beamforming in the multi-antenna transmitting processor 1357 and are provided from the transmitters 1354 to each antenna 1352. Each transmitter 1354 first converts a baseband symbol stream provided by the multi-antenna transmitting processor 1357 into a radio frequency symbol stream, and then provides the radio frequency symbol stream to the antenna 1352.

In uplink (UL) transmission, the function of the gNB 1310 is similar to the receiving function of the UE 1350 described in DL transmission. Each receiver 1318 receives a radio frequency signal via a corresponding antenna 1320, converts the received radio frequency signal into a baseband signal, and provides the baseband signal to the multi-antenna receiving processor 1372 and the receiving processor 1370. The receiving processor 1370 and the multi-antenna receiving processor 1372 jointly provide functions of the L1 layer. The controller/processor 1375 provides functions of the L2 layer. The controller/processor 1375 can be connected with the memory 1376 that stores program code and data. The memory 1376 can be called a computer readable medium. In UL transmission, the controller/processor 1375 provides de-multiplexing between a transport channel and a logical channel, packet reassembling, decryption, header decompression, control signal processing so as to recover a higher-layer packet from the UE 1350. The higher-layer packet coming from the controller/processor 1375 may be provided to the core network. The controller/processor 1375 can also perform error detection using ACK and/or NACK protocols to support HARQ operation.

In one embodiment, the UE 1350 comprises at least one processor and at least one memory. The at least one memory includes computer program codes. The at least one memory and the computer program codes are configured to be used in collaboration with the at least one processor.

In one subembodiment, the UE 1350 comprises a memory that stores a computer readable instruction program. The computer readable instruction program generates an action when executed by at least one processor. The action includes: receiving the first signaling in the present disclosure, transmitting the first radio signal in the present disclosure, receiving the second signaling in the present disclosure, transmitting the second radio signal in the present disclosure, receiving the first downlink signaling in the present disclosure in the present disclosure, and receiving the second downlink signaling in the present disclosure.

In one embodiment, the gNB 1310 comprises at least one processor and at least one memory. The at least one memory includes computer program codes. The at least one memory and the computer program codes are configured to be used in collaboration with the at least one processor.

In one subembodiment, the gNB 1310 comprises a memory that stores a computer readable instruction program. The computer readable instruction program generates an action when executed by at least one processor. The action includes: transmitting the first signaling in the present disclosure, receiving the first radio signal in the present disclosure, transmitting the second signaling in the present disclosure, receiving the second radio signal in the present disclosure, transmitting the first downlink signaling in the present disclosure and transmitting the second downlink signaling in the present disclosure.

In one subembodiment, the UE 1350 corresponds to the UE in the present disclosure.

In one subembodiment, the gNB 1310 corresponds to the base station in the present disclosure.

In one embodiment, at least one of the antenna 1352, the receiver 1354, the receiving processor 1356, the multi-antenna receiving processor 1358, or the controller/processor 1359 is used to receive the first signaling; at least one of the antenna 1320, the transmitter 1318, the transmitting processor 1316, the multi-antenna transmitting processor 1371, or the controller/processor 1375 is used to transmit the first signaling.

In one embodiment, at least one of the antenna 1320, the receiver 1318, the receiving processor 1370, the multi-antenna receiving processor 1372, or the controller/processor 1375 is used to receive the first radio signal; at least one of the antenna 1352, the transmitter 1354, the transmitting processor 1368, the multi-antenna transmitting processor 1357, or the controller/processor 1359 is used to transmit the first radio signal.

In one embodiment, at least one of the antenna 1352, the receiver 1354, the receiving processor 1356, the multi-antenna receiving processor 1358, or the controller/processor 1359 is used to receive the second signaling; at least one of the antenna 1320, the transmitter 1318, the transmitting processor 1316, the multi-antenna transmitting processor 1371, or the controller/processor 1375 is used to transmit the second signaling.

In one embodiment, at least one of the antenna 1320, the receiver 1318, the receiving processor 1370, the multi-antenna receiving processor 1372, or the controller/processor 1374 is used to receive the second radio signal; at least one of the antenna 1352, the transmitter 1354, the transmitting processor 1368, the multi-antenna transmitting processor 1357, or the controller/processor 1359 is used to transmit the second radio signal.

In one embodiment, at least one of the antenna 1352, the receiver 1354, the receiving processor 1356, the multi-antenna receiving processor 1358, or the controller/processor 1359 is used to receive the first downlink signaling; at least one of the antenna 1320, the transmitter 1318, the transmitting processor 1316, the multi-antenna transmitting processor 1371, or the controller/processor 1375 is used to transmit the first downlink signaling.

In one embodiment, at least one of the antenna 1352, the receiver 1354, the receiving processor 1356, the multi-antenna receiving processor 1358, or the controller/processor 1359 is used to receive the second downlink signaling; at least one of the antenna 1320, the transmitter 1318, the transmitting processor 1316, the multi-antenna transmitting processor 1371, or the controller/processor 1375 is used to transmit the second downlink signaling.

In one embodiment, the first receiver 201 in the Embodiment 8 comprises at least one of the antenna 1352, the receiver 1354, the receiving processor 1356, the multi-antenna receiving processor 1358, the controller/processor 1359, the memory 1360, or the data source 1367.

In one embodiment, the first transmitter in the Embodiment 8 comprises at least one of the antenna 1352, the transmitter 1354, the transmitting processor 1368, the multi-antenna transmitting processor 1357, the controller/processor 1359, the memory 1360, or the data source 1367.

In one embodiment, the second transmitter 301 in the Embodiment 9 comprises at least one of the antenna 1320, the transmitter 1318, the transmitting processor 1316, the multi-antenna transmitting processor 1371, the controller/processor 1375, or the memory 1376.

In one embodiment, the second receiver 302 in the Embodiment 9 comprises at least one of the antenna 1320, the receiver 1318, the receiving processor 1370, the multi-antenna receiving processor 1372, the controller/processor 1375, or the memory 1376.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, wireless sensor, network cards, communication modules for Internet of Things (IOT), vehicle-mounted communication equipment, terminals for IOT, RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) used for wireless communication, comprising:
   receiving a first signaling; and
   transmitting a first radio signal;
   wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

2. The method according to claim 1, wherein a number of REs occupied by the first radio signal in time-frequency domain is used to determine the M reference value(s),
   or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block;
   or, comprising:
   receiving a second signaling, and
   transmitting a second radio signal,
   wherein a number of REs occupied by the second radio signal in time-frequency domain is used to determine the M reference value(s), the second radio signal carries the second type bit block, the second radio signal is an initial transmission of the second type bit block, the first radio signal is a retransmission of the second type bit block, the second signaling comprises scheduling information of the second radio signal;
   or, a number of REs occupied by the first radio signal in time-frequency domain is used to determine the M reference value(s), the M reference value(s) is(are) equal to a ratio of the number of REs occupied by the first radio signal in time-frequency domain to a number of bits comprised in the second type bit block respectively;
   or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block, the M reference value(s) is(are) equal to a ratio of the number of REs occupied by the second radio signal in time-frequency domain to a number of bits comprised in the second type bit block respectively;

or, the M first type sub-signal(s) corresponds(correspond) to M first limit value(s) respectively, for any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

3. The method according to claim 1, wherein the first signaling is used to determine M first offset(s), the M first type value(s) corresponds(correspond) to the M first offset(s) respectively, any first type value of the M first type value(s) is linearly correlated to a corresponding first offset;

or, the first signaling is used to determine M first offset(s), the M first type value(s) corresponds(correspond) to the M first offset(s) respectively, any first type value of the M first type value(s) is linearly correlated to a corresponding first offset, any first type value of the M first type value(s) is equal to a product of the corresponding first offset and the corresponding reference value.

4. The method according to claim 3, comprising:

receiving a first downlink signaling, wherein the first downlink signaling is used to determine M offset set(s), any offset set of the M offset set(s) comprises a positive integer number of offset(s), the M first offset(s) belongs(belong) to the M offset set(s) respectively;

or, comprising:

receiving a first downlink signaling, wherein the first downlink signaling is used to determine M offset set(s), any offset set of the M offset set(s) comprises a positive integer number of offset(s), the M first offset(s) belongs(belong) to the M offset set(s) respectively, the first signaling comprises a first field, the first field of the first signaling explicitly indicates an index of each first offset of the M first offset(s) in a corresponding offset set;

or, comprising:

receiving a first downlink signaling, wherein the first downlink signaling is used to determine M offset set(s), any offset set of the M offset set(s) comprises a positive integer number of offset(s), the M first offset(s) belongs(belong) to the M offset set(s) respectively, an index of any first offset of the M first offset(s) in a corresponding offset set is related to a first parameter, the first parameter includes at least one of a user case for the second type bit block, a number of transmissions, a Modulation and Coding Scheme (MCS) of the second type sub-signal, a Redundancy Version (RV) of the second type sub-signal, or a time-frequency resource occupied by the first radio signal, the number of transmissions is a number of transmissions of the second type bit block as of the first radio signal.

5. The method according to claim 1, wherein the first signaling is used to determine a second offset, the M first type value(s) is(are) linearly correlated to the second offset respectively;

or, comprising:

receiving a second downlink signaling, wherein the first signaling is used to determine a second offset, the M first type value(s) is(are) linearly correlated to the second offset respectively, the second downlink signaling is used to determine M first offset(s), the M first type value(s) corresponds (correspond) to the M first offset(s) respectively, any first type value of the M first type value(s) is linearly correlated to a corresponding first offset.

6. A method in a base station used for wireless communication, comprising:

transmitting a first signaling; and receiving a first radio signal;

wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

7. The method according to claim 6, wherein a number of REs occupied by the first radio signal in time-frequency domain is used to determine the M reference value(s);

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block;

or, comprising:

transmitting a second signaling, and receiving a second radio signal, wherein a number of REs occupied by the second radio signal in time-frequency domain is used to determine the M reference value(s), the second radio signal carries the second type bit block, the second radio signal is an initial transmission of the second type bit block, the first radio signal is a retransmission of the second type bit block, the second signaling comprises scheduling information of the second radio signal;

or, a number of REs occupied by the first radio signal in time-frequency domain is used to determine the M reference value(s), the M reference value(s) is(are) equal to a ratio of the number of REs occupied by the first radio signal in time-frequency domain to a number of bits comprised in the second type bit block respectively;

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block, the M reference value(s) is(are) equal to a ratio of the number of REs occupied by the second radio signal in time-frequency domain to a number of bits comprised in the second type bit block respectively;

or, the M first type sub-signal(s) corresponds(correspond) to M first limit value(s) respectively, for any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

8. The method according to claim 6, wherein the first signaling is used to determine M first offset(s), the M first type value(s) corresponds(correspond) to the M first offset(s) respectively, any first type value of the M first type value(s) is linearly correlated to a corresponding first offset;

or, the first signaling is used to determine M first offset(s), the M first type value(s) corresponds(correspond) to the M first offset(s) respectively, any first type value of the M first type value(s) is linearly correlated to a corresponding first offset, any first type value of the M first type value(s) is equal to a product of the corresponding first offset and the corresponding reference value.

9. The method according to claim 8, comprising:
transmitting a first downlink signaling,
wherein the first downlink signaling is used to determine M offset set(s), any offset set of the M offset set(s) comprises a positive integer number of offset(s), the M first offset(s) belongs(belong) to the M offset set(s) respectively;

or, comprising:
transmitting a first downlink signaling,
wherein the first downlink signaling is used to determine M offset set(s), any offset set of the M offset set(s) comprises a positive integer number of offset(s), the M first offset(s) belongs(belong) to the M offset set(s) respectively, the first signaling comprises a first field, the first field of the first signaling explicitly indicates an index of each first offset of the M first offset(s) in a corresponding offset set;

or, comprising:
transmitting a first downlink signaling,
wherein the first downlink signaling is used to determine M offset set(s), any offset set of the M offset set(s) comprises a positive integer number of offset(s), the M first offset(s) belongs(belong) to the M offset set(s) respectively, an index of any first offset of the M first offset(s) in a corresponding offset set is related to a first parameter, the first parameter includes at least one of a user case for the second type bit block, a number of transmissions, an MCS of the second type sub-signal, an RV of the second type sub-signal, or a time-frequency resource occupied by the first radio signal, the number of transmissions is a number of transmissions of the second type bit block as of the first radio signal.

10. The method according to claim 6, wherein the first signaling is used to determine a second offset, the M first type value(s) is(are) linearly correlated to the second offset respectively;

or, comprising:
transmitting a second downlink signaling,
wherein the first signaling is used to determine a second offset, the M first type value(s) is(are) linearly correlated to the second offset respectively, the second downlink signaling is used to determine M first offset(s), the M first type value(s) corresponds(correspond) to the M first offset(s) respectively, any first type value of the M first type value(s) is linearly correlated to a corresponding first offset.

11. A User Equipment (UE) used for wireless communication, comprising the following modules:
a first receiver, receiving a first signaling; and
a first transmitter, transmitting a first radio signal;
wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

12. The UE according to claim 11, wherein a number of REs occupied by the first radio signal in time-frequency domain is used to determine the M reference value(s);

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block;

or, the first receiver receives a second signaling, and the first transmitter transmits a second radio signal, wherein a number of REs occupied by the second radio signal in time-frequency domain is used to determine the M reference value(s), the second radio signal carries the second type bit block, the second radio signal is an initial transmission of the second type bit block, the first radio signal is a retransmission of the second type bit block, the second signaling comprises scheduling information of the second radio signal;

or, a number of REs occupied by the first radio signal in time-frequency domain is used to determine the M reference value(s), the M reference value(s) is(are) equal to a ratio of the number of REs occupied by the first radio signal in time-frequency domain to a number of bits comprised in the second type bit block respectively;

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block, the M reference value(s) is(are) equal to a ratio of the number of REs occupied by the second radio signal in time-frequency domain to a number of bits comprised in the second type bit block respectively;

or, the M first type sub-signal(s) corresponds(correspond) to M first limit value(s) respectively, for any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

13. The UE according to claim 11, wherein the first signaling is used to determine M first offset(s), the M first type value(s) corresponds(correspond) to the M first offset(s) respectively, any first type value of the M first type value(s) is linearly correlated to a corresponding first offset;

or, the first signaling is used to determine M first offset(s), the M first type value(s) corresponds(correspond) to the M first offset(s) respectively, any first type value of the M first type value(s) is linearly correlated to a corresponding first offset, any first type value of the M first type value(s) is equal to a product of the corresponding first offset and the corresponding reference value.

14. The UE according to claim 13, wherein the first receiver receives a first downlink signaling, wherein the first downlink signaling is used to determine M offset set(s), any offset set of the M offset set(s) comprises a positive integer number of offset(s), the M first offset(s) belongs(belong) to the M offset set(s) respectively;

or, the first receiver receives a first downlink signaling, wherein the first downlink signaling is used to determine M offset set(s), any offset set of the M offset set(s) comprises a positive integer number of offset(s), the M first offset(s) belongs(belong) to the M offset set(s) respectively, the first signaling comprises a first field, the first field of the first signaling explicitly indicates an index of each first offset of the M first offset(s) in a corresponding offset set;

or, the first receiver receives a first downlink signaling, wherein the first downlink signaling is used to determine M offset set(s), any offset set of the M offset set(s) comprises a positive integer number of offset(s), the M first offset(s) belongs(belong) to the M offset set(s) respectively, an index of any first offset of the M first offset(s) in a corresponding offset set is related to a first parameter, the first parameter includes at least one of a user case for the second type bit block, a number of transmissions, an MCS of the second type sub-signal, an RV of the second type sub-signal, or a time-frequency resource occupied by the first radio signal, the number of transmissions is a number of transmissions of the second type bit block as of the first radio signal.

15. The UE according to claim 11, wherein the first signaling is used to determine a second offset, the M first type value(s) is(are) linearly correlated to the second offset respectively;

or, the first receiver receives a second downlink signaling, wherein the first signaling is used to determine a second offset, the M first type value(s) is(are) linearly correlated to the second offset respectively, the second downlink signaling is used to determine M first offset(s), the M first type value(s) corresponds (correspond) to the M first offset(s) respectively, any first type value of the M first type value(s) is linearly correlated to a corresponding first offset.

16. A base station used for wireless communication, comprising:

a second transmitter, transmitting a first signaling; and
a second receiver, receiving a first radio signal;
wherein the first signaling comprises scheduling information of the first radio signal, the first radio signal comprises M first type sub-signal(s) and a second type sub-signal, the M first type sub-signal(s) carries(carry) M first type bit block(s) respectively, the second type sub-signal carries a second type bit block; M first type value(s) is(are) respectively used to determine a number(numbers) of Resource Elements (REs) occupied by the M first type sub-signal(s) in time-frequency domain; the M first type value(s) corresponds(correspond) to M reference value(s) respectively, the first signaling is used to determine a ratio of each first type value of the M first type value(s) to a corresponding reference value; the M is a positive integer.

17. The base station according to claim 16, wherein a number of REs occupied by the first radio signal in time-frequency domain is used to determine the M reference value(s);

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block;

or, the second transmitter transmits a second signaling, and the second receiver receives a second radio signal, wherein a number of REs occupied by the second radio signal in time-frequency domain is used to determine the M reference value(s), the second radio signal carries the second type bit block, the second radio signal is an initial transmission of the second type bit block, the first radio signal is a retransmission of the second type bit block, the second signaling comprises scheduling information of the second radio signal;

or, a number of REs occupied by the first radio signal in time-frequency domain is used to determine the M reference value(s), the M reference value(s) is(are) equal to a ratio of the number of REs occupied by the first radio signal in time-frequency domain to a number of bits comprised in the second type bit block respectively;

or, a number of REs occupied by a second radio signal in time-frequency domain is used to determine the M reference value(s), the second radio signal carries the second type bit block, the second radio signal is an initial transmission of the second type bit block, the first radio signal is a retransmission of the second type bit block, the M reference value(s) is(are) equal to a ratio of the number of REs occupied by the second radio signal in time-frequency domain to a number of bits comprised in the second type bit block respectively;

or, the M first type sub-signal(s) corresponds(correspond) to M first limit value(s) respectively, for any given first type sub-signal of the M first type sub-signal(s), a number of REs occupied by the given first type sub-signal in time-frequency domain is equal to a minimum value between a corresponding first limit value and a product of a corresponding first type value and a number of bits comprised in a corresponding first type bit block.

18. The base station according to claim 16, wherein the first signaling is used to determine M first offset(s), the M first type value(s) corresponds(correspond) to the M first offset(s) respectively, any first type value of the M first type value(s) is linearly correlated to a corresponding first offset;

or, the first signaling is used to determine M first offset(s), the M first type value(s) corresponds(correspond) to the M first offset(s) respectively, any first type value of the M first type value(s) is linearly correlated to a corresponding first offset, any first type value of the M first type value(s) is equal to a product of the corresponding first offset and the corresponding reference value.

19. The base station according to claim 18, wherein the second transmitter transmits a first downlink signaling, wherein the first downlink signaling is used to determine M offset set(s), any offset set of the M offset set(s) comprises a positive integer number of offset(s), the M first offset(s) belongs(belong) to the M offset set(s) respectively;

or, the second transmitter transmits a first downlink signaling, wherein the first downlink signaling is used to determine M offset set(s), any offset set of the M offset set(s) comprises a positive integer number of offset(s), the M first offset(s) belongs(belong) to the M offset set(s) respectively, the first signaling comprises a first field, the first field of the first signaling explicitly indicates an index of each first offset of the M first offset(s) in a corresponding offset set;

or, the second transmitter transmits a first downlink signaling, wherein the first downlink signaling is used to determine M offset set(s), any offset set of the M offset set(s) comprises a positive integer number of offset(s), the M first offset(s) belongs(belong) to the M offset set(s) respectively, an index of any first offset of the M first offset(s) in a corresponding offset set is related to a first parameter, the first parameter includes at least one of a user case for the second type bit block, a number of transmissions, an MCS of the second type sub-signal, an RV of the second type sub-signal, or a time-frequency resource occupied by the first radio signal, the number of transmissions is a number of transmissions of the second type bit block as of the first radio signal.

20. The base station according to claim 16, wherein the first signaling is used to determine a second offset, the M first type value(s) is(are) linearly correlated to the second offset respectively;

or, the second transmitter transmits a second downlink signaling, wherein the first signaling is used to determine a second offset, the M first type value(s) is(are) linearly correlated to the second offset respectively, the second downlink signaling is used to determine M first offset(s), the M first type value(s) corresponds(correspond) to the M first offset(s) respectively, any first type value of the M first type value(s) is linearly correlated to a corresponding first offset.

* * * * *